United States Patent
Nishiuchi et al.

(10) Patent No.: US 11,803,522 B2
(45) Date of Patent: Oct. 31, 2023

(54) DATABASE, MATERIAL DATA PROCESSING SYSTEM, AND METHOD OF CREATING DATABASE

(71) Applicant: PROTERIAL, LTD., Tokyo (JP)

(72) Inventors: Takeshi Nishiuchi, Tokyo (JP); Daisuke Furusawa, Tokyo (JP); Asami Oya, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

(21) Appl. No.: 17/879,067

(22) Filed: Aug. 2, 2022

(65) Prior Publication Data
US 2023/0041536 A1    Feb. 9, 2023

(30) Foreign Application Priority Data
Aug. 5, 2021  (JP) ................. 2021-128755

(51) Int. Cl.
G06F 17/30     (2006.01)
G06F 16/21     (2019.01)
G06F 16/28     (2019.01)
G06F 16/22     (2019.01)

(52) U.S. Cl.
CPC ........ G06F 16/211 (2019.01); G06F 16/2291 (2019.01); G06F 16/284 (2019.01)

(58) Field of Classification Search
CPC .......... G06F 16/13; G06F 16/21; G06F 16/24; G06F 16/156; G06N 3/00; G06N 5/00; G05B 13/00
See application file for complete search history.

(56) References Cited

U.S. PATENT DOCUMENTS

2021/0397769 A1*  12/2021  Okuno ................. C22C 1/00
2022/0358438 A1   11/2022  Asahara et al.

FOREIGN PATENT DOCUMENTS

| CN | 110516701 A | 11/2019 |
| JP | 2021-033964 A | 3/2021 |
| JP | 2021-047627 A | 3/2021 |
| WO | 2020/090848 A1 | 5/2020 |

OTHER PUBLICATIONS

Kabiraj et al., "High-throughput discovery of high Curie point two-dimensional ferromagnetic materials", nature partner journals, Computational Materials, Article No. 35, https://doi.org/10.1038/s41524-020-0300-2, Apr. 8, 2020, 9 pages.

Nelson et al., "Predicting the Curie temperature of ferromagnets using machine learning", arXiv:1906.08534v1, Jun. 21, 2019, 12 pages.

(Continued)

Primary Examiner — Hung D Le
(74) Attorney, Agent, or Firm — KEATING & BENNETT, LLP

(57) ABSTRACT

A database storing data associated with an identifier unique to each sample, the data including first data representative of at least one of composition data, processing data, and property data for the each sample, and second data representative of microstructure data for the each sample. The microstructure data includes a feature determined based on a temperature dependence of magnetization for the each sample.

11 Claims, 17 Drawing Sheets

| EXPERIMENT No. | IDENTIFIER (ID) | | COMPOSITION (mass%) | | | | |
|---|---|---|---|---|---|---|---|
| | SAMPLE LABEL | No. | A | B | C | | X |
| 2021-01 | 2021A001 | 1 | 10 | 10 | 10 | | 40 |
| 2021-01 | 2021A002 | 1 | 10 | 15 | 15 | | 30 |
| 2021-01 | 2021A002 | 2 | 10 | 15 | 15 | | 30 |
| 2021-01 | 2021A003 | 1 | 10 | 15 | 15 | | 30 |
| 2021-02 | 2021A004 | 1 | 15 | 10 | 10 | | 50 |
| ⋮ | ⋮ | | | | | | |
| 2021-85 | 2021E055 | 1 | 30 | 20 | 5 | | 30 |

(56) References Cited

OTHER PUBLICATIONS

Hatakeyama, "Machine Learning for Material Science", Japanese Neural Network Society Journal, vol. 28, No. 1, 2021, pp. 20-27.
Tamura et al., "Materials informatics approach to understand aluminum alloys", Science and Technology of Advanced Materials, vol. 2., No. 1, https://doi.org/10.1080/14686996.2020.1791676, Jul. 29, 2020, 13 pages.
Koseki, "Materials data and Materials Integration System", Journal of information processing and management, vol. 59, No. 3, 2016, pp. 165-171.
Official Communication issued in corresponding Japanese Patent Application No. 2021-128755, dated Sep. 28, 2022.
Nishiuchi et al., "Database, Material Data Processing System, and Method of Creating Database", U.S. Appl. No. 18/205,762, filed Jun. 5, 2023.
Tamura et al., "Materials informatics approach to understand aluminum alloys", Science and Technology of Advanced Materials, vol. 21, No. 1, https://doi.org/10.1080/14686996.2020.1791676, Jul. 29, 2020, 13 pages.

\* cited by examiner

| EXPERIMENT No. | IDENTIFIER (ID) | | COMPOSITION (mass%) | | | | |
|---|---|---|---|---|---|---|---|
| | SAMPLE LABEL | No. | A | B | C | | X |
| 2021-01 | 2021A001 | 1 | 10 | 10 | 10 | | 40 |
| 2021-01 | 2021A002 | 1 | 10 | 15 | 15 | | 30 |
| 2021-01 | 2021A002 | 2 | 10 | 15 | 15 | | 30 |
| 2021-01 | 2021A003 | 1 | 10 | 15 | 15 | | 30 |
| 2021-02 | 2021A004 | 1 | 15 | 10 | 10 | | 50 |
| ⋮ | | | ⋮ | | | | |
| 2021-85 | 2021E055 | 1 | 30 | 20 | 5 | | 30 |

| PROCESSING CONDITION | | | | |
|---|---|---|---|---|
| OXYGEN (%) | TEMP. (°C) | TIME (h) | | POST-PROCESS |
| 20 | 1200 | 3 | | A |
| 20 | 1200 | 4 | | A |
| 20 | 1200 | 4 | | A |
| 20 | 1250 | 3 | | B |
| 10 | 1150 | 5 | | C |
| ⋮ | | | | |
| 20 | 1200 | 4 | | B |

FIG.9C

| | | MICROSTRUCTURE | | | | |
|---|---|---|---|---|---|---|
| $T_c$ (1) (°C) | $T_c$ (2) (°C) | Main Phase a-axis (nm) | Main Phase b-axis (nm) | Main Phase c-axis (nm) | ... | Main Phase Lattice volume (nm³) |
| 431.1 | 452.5 | 0.351 | 0.361 | 0.553 | ... | 0.0701 |
| 427.8 | – | 0.351 | 0.362 | 0.552 | | 0.0701 |
| 428.0 | – | 0.351 | 0.362 | 0.552 | | 0.0701 |
| 418.3 | – | 0.353 | 0.362 | 0.556 | | 0.0710 |
| 421.1 | 455.3 | 0.354 | 0.361 | 0.555 | | 0.0709 |
| 417.9 | 443.1 | 0.353 | 0.360 | 0.557 | | 0.0708 |

FIG.9D

| PROPERTIES | | | | |
|---|---|---|---|---|
| Densiy (g/cm³) | $B_r$ (T) | $H_{cJ}$ (kA/m) | | $H_k/H_{cJ}$ (%) |
| 4.92 | 0.38 | 351 | ... | 86 |
| 5.11 | 0.45 | 390 | | 94 |
| 5.12 | 0.46 | 402 | | 95 |
| 5.19 | 0.51 | 378 | | 92 |
| 5.00 | 0.39 | 513 | | 79 |
| 4.98 | 0.42 | 351 | ... | 83 |

DATABASE, MATERIAL DATA PROCESSING SYSTEM, AND METHOD OF CREATING DATABASE

BACKGROUND

1. Technical Field

The present disclosure relates to a database, a material data processing system, and a method of creating a database.

2. Description of the Related Art

In the field of materials development, the composition and production conditions of materials are usually optimized based on theoretical predictions and experiments in order to achieve desired material properties. Conventionally, such optimization of the composition and production conditions often depends on the experience of the material researcher or engineer. However, as developed materials have higher performance, the materials contain a greater number of types of constituent elements, and the microstructure of the materials becomes more complex. Accordingly, the number of experiments required to achieve desired material properties increases, and the time, labor and cost required for the material development significantly increases.

As a solution to these problems, materials informatics, which employs informatics such as data mining to efficiently search for novel or alternative materials, has been receiving attention. In Japan, materials development based on "materials integration" has been studied. Materials integration can be defined as a comprehensive material technology tool that aims to support research and development of materials by integrating science technologies, such as theory, experiment, analysis, simulation and database, with the results of the materials science.

WO 2020/090848 discloses a material design device for use in designing a design target material including a material having a plurality of compositions or a material to be produced under a combination of a plurality of production conditions. This device utilizes a learned model which has acquired, by machine learning, the correspondence between input information including the design conditions for the design target material and output information including the material property values.

Toshihiko Koseki, "Materials data and Materials Integration System" *JOHO KANRI (Journal of information processing and management)*, Vol. 59, No. 3, p. 165 (2016) describes a system for predicting the microstructure and properties of a material based on the composition of the material and the production conditions (processing) of the material and further predicting the performance of the material based on the predicted microstructure and properties. This system stores a series of data regarding the material, such as "composition," "processing," "microstructure" and "properties," and metadata that is supplementary to the data.

SUMMARY

In the device disclosed in WO 2020/090848, a model is constructed for predicting the "properties" of a material from the "composition" and "processing" of the material. Koseki puts a focus on the fact that the "properties" of a material depend on the "composition" of the material and the "microstructure" of the material, and describes using the data of the "microstructure" of the material in combination with the data of the "processing" and "properties." The data regarding the "microstructure" of the material can be acquired by measurement or observation using, for example, X-ray diffraction, optical microscope, or scanning electron microscope, as will be described later in detail.

However, the data regarding the "microstructure" has the following problems: the reliability of the data greatly varies depending on the skills of a person who measures or observes the microstructure, and it is difficult to mechanically acquire a large amount of data.

An embodiment of the present disclosure provides a database, a material data processing system, and a method of creating a database, which can solve the above-described problems.

According to a nonlimiting exemplary embodiment, a database of the present disclosure is a database storing data associated with an identifier unique to each sample, the data including first data representative of at least one of composition data, processing data, and property data for the each sample, and second data representative of microstructure data for the each sample. The microstructure data includes a feature determined based on a temperature dependence of magnetization for the each sample.

In one embodiment, the feature determined based on the temperature dependence of magnetization is a feature regarding a magnetic phase transition.

In one embodiment, the feature regarding the magnetic phase transition includes at least one of a Curie temperature and a Néel temperature.

In one embodiment, the first data includes, as the composition data, a type of elements contained in the each sample and a composition ratio of the elements, and the first data includes, as the processing data, a parameter that defines a condition of a heat treatment performed in a step of producing the each sample.

In one embodiment, the first data includes, as the property data, at least one of a residual magnetic flux density, coercivity, saturation magnetization (saturation magnetic polarization) and magnetic permeability of the each sample.

In one embodiment, the second data includes, as the microstructure data, a parameter that defines a crystal structure of a primary phase contained in the each sample.

According to a nonlimiting exemplary embodiment, a material data processing system of the present disclosure includes: at least one unit of any one of the foregoing databases; and a data processing device capable of accessing the database to retrieve the data therefrom, wherein the data processing device receives an input of a variable of a microstructure, which includes a feature determined based on a temperature dependence of magnetization of a material, and outputs a variable that defines a property of the material, a variable that defines a composition of the material, and/or a variable that defines processing of the material.

According to a nonlimiting exemplary embodiment, another material data processing system of the present disclosure includes: at least one unit of any one of the foregoing databases; and a data processing device capable of accessing the database to retrieve the data therefrom, wherein the data processing device receives an input of a variable that defines a property of a material, and outputs a variable of a microstructure, which includes a feature determined based on a temperature dependence of magnetization of the material.

According to a nonlimiting exemplary embodiment, still another material data processing system of the present disclosure includes: at least one unit of any one of the foregoing databases; and a data processing device capable of accessing the database to retrieve the data therefrom, wherein the data processing device receives an input of a variable that defines a composition of a material and/or a variable that defines processing of the material, and outputs a variable of a microstructure, which includes a feature determined based on a temperature dependence of magnetization of the material.

In one embodiment, the data processing device calculates an output value of an objective variable from an input value of an explanatory variable based on a mathematical model that is based on the data stored in the database, and the mathematical model includes the feature determined based on the temperature dependence of magnetization as an explanatory variable that defines the microstructure and includes at least one of the composition, processing and property as an objective variable.

In one embodiment, the data processing device calculates an output value of an explanatory variable from an input value of an objective variable based on a mathematical model that is based on the data stored in the database, and the mathematical model includes the feature determined based on the temperature dependence of magnetization as an explanatory variable that defines the microstructure and includes at least one of the composition, processing and property as an objective variable.

According to a nonlimiting exemplary embodiment, still another material data processing system of the present disclosure includes: at least one unit of any one of the foregoing databases; and a data processing device capable of accessing the database to retrieve the data therefrom, wherein the data processing device includes a mathematical model configurator capable of constructing a mathematical model based on a first variable and a second variable, the first variable being defined by at least one of the composition data, the processing data and the property data of the first data, which is an objective variable, and the second variable being defined by the microstructure data including a feature determined based on the temperature dependence of magnetization of the second data, which is an explanatory variable.

According to a nonlimiting exemplary embodiment, still another material data processing system of the present disclosure is a material data processing system capable of generating an output value from an input value based on a mathematical model, wherein the mathematical model includes a first variable defined by at least one of composition data, processing data and property data of a material, and a second variable defined by microstructure data, and the second variable includes a feature determined based on a temperature dependence of magnetization.

In one embodiment, the material data processing system includes: a processor; and a memory connected with the processor, the memory storing a program that defines an operation of the processor, wherein the processor executes an arithmetic operation based on the mathematical model according to the program to determine the output value, which is at least one variable that defines a composition, processing, property and microstructure of the material, from the input value, which is at least one variable that defines the composition, processing, property and microstructure of the material.

According to a nonlimiting exemplary embodiment, a method of creating a database according to the present disclosure includes: collecting data associated with an identifier unique to each sample, the data including data of at least one of a composition, processing and property which are acquired for the each sample, and data of a microstructure which are acquired for the each sample; and storing the collected data in a storage, wherein when the data includes a feature determined based on a temperature dependence of magnetization which is acquired for the sample, the feature is associated at least as data of the microstructure with the identifier.

According to an embodiment of the present disclosure, acquisition of data regarding the microstructure is easy, and the variation in quality of data which is attributed to the skills of data miners can be suppressed. Further, the data can also be mechanically acquired.

BRIEF DESCRIPTION OF THE DRAWINGS

FIG. 9C is a diagram showing an example of parts of a table that shows items to be registered in a database according to an embodiment of the present disclosure.

FIG. 9D is a diagram showing an example of parts of a table that shows items to be registered in a database according to an embodiment of the present disclosure.

DETAILED DESCRIPTION

Figure 1:
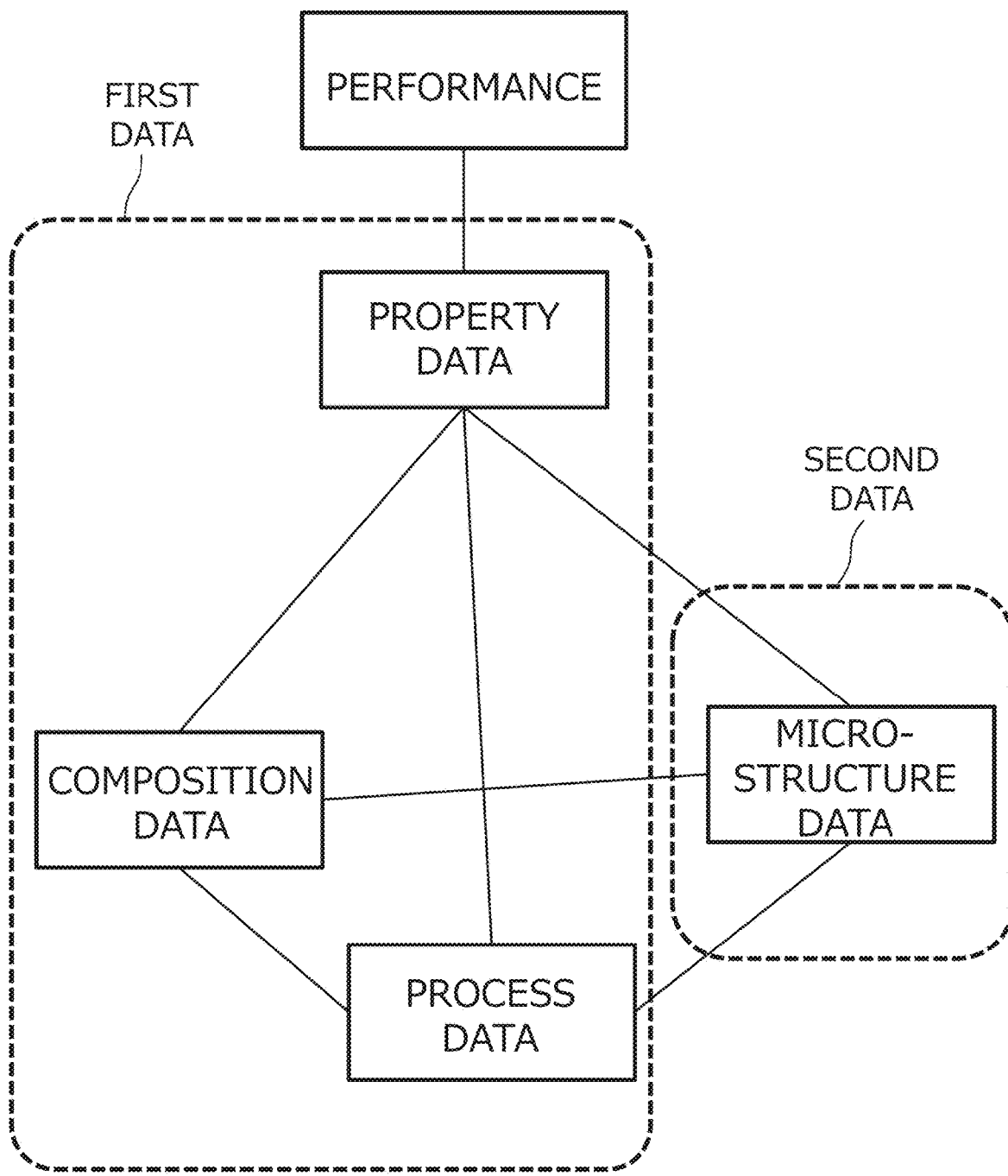
FIG. 1 is a schematic diagram for illustrating the type of data to be registered in a database according to the present disclosure.

The device described in WO 2020/090848 includes a "design condition-material property" table, which is equivalent to a database. In this table, information about the composition of a drawn ferrous alloy material, such as "C (carbon)," "B (boron)," "N (nitrogen)," and "Si (silicon)," data regarding the conditions in production steps, such as "casting," "hot working," and "heat treatment," data regarding the microstructure, such as "austenite crystal grain size" and "ferrite crystal grain size," and data regarding the material properties, such as "0.2% proof stress" and "tensile strength," are stored.

Conventionally, in the case of a metal or ceramic material, for example, the data regarding the "microstructure" include information about the type of phases (compounds) in the material, the proportion of each phase, the size of each phase, the composition, etc. Of these items of information, the type and proportion of the phase may be determined using X-Ray Diffraction (XRD). The size of each phase is determined by performing cross-sectional polishing of the material, observation with an optical microscope or scanning electron microscope (SEM), and thereafter image analysis. The composition of each phase is often determined by Energy Dispersive X-ray spectroscopy (EDX) which is included in the SEM system or Electron Probe Micro Analyzer (EPMA).

However, when the size of a phase of interest in the material is extremely small, it is difficult to acquire accurate information by evaluating the composition by SEM/EDX or EPMA because the information about the composition in neighboring phases around the phase of interest are superposed due to the divergence of an incident electron beam. In addition, SEM/EDX and EPMA may not only take time in pretreatment and observation of samples but also cause the data quality to greatly vary depending on the skills of the observer in sample pretreatment and observation and the subjective judgement by the observer (as to which area is to be evaluated). Further, the phase proportion and the composition of each phase cannot be determined from the acquired data without complicated procedures such as image processing, and therefore, it is difficult to obtain a large amount of data required for use of data science.

Meanwhile, it is possible to obtain a lattice constant from a diffraction peak acquired by XRD and to obtain detailed information about the crystal structure by precise measurement such as Rietveld analysis. However, in the case of a magnetic material, for example, the difference in the crystal structure between different phases in the same material may be reflected only in whether or not particular superlattice reflection occurs. When a phase of interest in the material is very small in amount, it is difficult to detect this phase. When a plurality of phases which have the same crystal structure but different compositions coexist in a material, it is difficult to separate these phases.

Thus, in the case of a material whose properties are susceptible to a very small constituent phase, particularly in the case of a magnetic material, it is difficult to acquire data regarding the microstructure with high efficiency and high sensitivity without largely depending on the skills or subjective judgement of the measurer. This problem can make it very difficult, particularly in the field of magnetic materials, to use materials informatics in search for novel or alternative materials.

A database, a material data processing system, and a method of creating a database according to the present disclosure can solve the above-described problems. This point will be described in the following sections.

<Type of Data in Database>

Firstly, the type of data used in an embodiment of a database according to the present disclosure is described with reference to FIG. 1. The database of the present disclosure stores data associated with an identifier unique to each sample. The data stored in this database include the first data and second data. The first data include at least one of composition data, processing data (production conditions), and property data. In the example of FIG. 1, the first data include all of the composition data, the processing data and the property data but does not need to include all of these data. The first data may include other types of data than the composition data, the processing data and the property data.

As shown in FIG. 1, the second data include microstructure data. According to the database of the present disclosure, the contents of the second data (microstructure data) are characteristic.

Hereinafter, the "composition data," the "processing data," the "property data" and the "microstructure data" are described.

The "composition data" are information that define the "composition" of a material, and include the type and composition ratio of constituent elements. The "composition data" may include information that define the type and composition of unavoidable impurities or controlled amounts of trace elements (including impurities in addition to intentionally-added elements).

The "processing data" are information that define the "processing" of a material, and include information about various production conditions (temperature, atmosphere, thermal history, applied pressure, etc.) in the steps of producing the material.

The "property data" are information that define the "properties" of a material, and include the mechanical properties and the physical and chemical characteristics of the material. Herein, the "property data" are distinguished from the "performance" of the material. The "performance" is a characteristic of a material as to the weatherability or reliability, which is demonstrated when the material is used in the form of a part, and is an evaluation item that depends on the environment in which the material is used. In this specification, the information and/or features that define the "properties" may be referred to as "material properties."

The "microstructure data" are information that define the "microstructure" of a material, and usually can include information about the proportion of the constituent phases of the material, the crystal structure, the molecular geometry, the crystalline state (monocrystal/polycrystal/amorphous), the shape and size of crystal grains in the case of polycrystal, the crystal orientation, the grain boundary, crystal twinning, the type and density of defects such as stacking defects and dislocation, and segregation of a solute element at the grain boundary and in the grains. In this specification, the information and/or features that define the "microstructure" may be referred to as "microstructure features."

<Feature Determined Based on Temperature Dependence of Magnetization>

In the database of the present disclosure, information about the "magnetic phase transition," which has conventionally been used as information that define the "properties" of a material (property data), is used as an index that defines the "microstructure" of the material (microstructure data). Specifically, the database is configured such that the microstructure data include a feature determined based on the temperature dependence of magnetization for each sample. This configuration contributes to the following advantages.

Firstly, the "feature determined based on the temperature dependence of magnetization," which is the information about the magnetic phase transition, is described. A typical example of the magnetic phase transition is "ferromagnetic-paramagnetic phase transition." The temperature at which such a magnetic phase transition occurs is called Curie temperature ($T_c$) or Curie point. The Curie temperature of a material heavily depends on the crystal structure and composition of the constituent phases of the material. As previously described, conventionally, the Curie temperature has been used as an index of the "properties" of magnetic materials. For example, in the case of a permanent magnetic material, materials of higher Curie temperatures are usually highly evaluated because they can be stably used even at high temperatures. In the case of a temperature-sensitive magnetic material or magnetocaloric material, the Curie temperature is required to be set to a temperature at which the material is requested to function.

The present inventors put a focus on the fact that, contrary to such conventional technological common knowledge, the magnetic phase transition itself is an inherent physical property that reflects the crystal structure and composition of a magnetic phase in a material, and reached a concept that the measured value of the magnetic phase transition is used as an index that reflects the "microstructure" such as crystal structure and composition (microstructure data), rather than as an index for judging the level (e.g., excellent or poor) of the "properties" of the material (property data). As will be described later, in acquisition of the information about "magnetic phase transition," i.e., "the feature determined based on the temperature dependence of magnetization," the quality of the data is unlikely to vary according to the personal skills of data miners, and the data can be mechanically acquired. When such a measured value is used as a feature of the "microstructure," it is possible to construct such a mathematical model that cannot be constructed from a conventional database, and it is expected that development of materials by the materials informatics is advanced.

In an embodiment of a database, a material data processing system, and a method of creating a database according to the present disclosure, a material to be considered is not limited to permanent magnet or magnetic materials such as soft magnetic materials. For example, the database, the material data processing system, and the method of creating a database according to the present disclosure are effectively applicable to a case where at least one of the phases produced in a material undergoes a magnetic phase transition. Even the information that "a phase which has a magnetic phase transition is not found in the material" can be helpful information that define the microstructure of the material.

<Extraction of the Feature Determined Based on the Temperature Dependence of Magnetization>

In an example described herein, the feature determined based on the temperature dependence of magnetization is a feature regarding the magnetic phase transition. In this example, the feature regarding the magnetic phase transition is a feature representative of a microstructural feature resulting from a "ferromagnetic-paramagnetic phase transition," and can be defined by the Curie temperature. Note that, in the present disclosure, the term "ferromagnetic" includes not only "ferromagnetism" but also "ferrimagnetism." A feature representative of a microstructural feature resulting from an "antiferromagnetic-paramagnetic phase transition" may be used. Such a feature can be defined by a Néel temperature.

Detection of the "ferromagnetic-paramagnetic phase transition" or "Curie temperature" can be realized by, for example, determining the temperature dependence of the amount of a magnetic flux produced from a sample material using a vibrating sample magnetometer (VSM). The detection can also be realized by determining the temperature dependence of the magnitude of a force exerted onto a material by an externally-applied magnetic field, as in the case of a thermomagnetic balance, or by measuring the entropic change caused by a magnetic phase transition using a differential scanning calorimeter (DSC). Among these methods, the measurement with the use of a thermomagnetic balance, particularly a thermogravity (TG) measuring device, is capable of simple and high-sensitivity measurement. Hereinafter, an example of extracting the feature regarding the magnetic phase transition using a TG measuring device is described.

Figure 2:
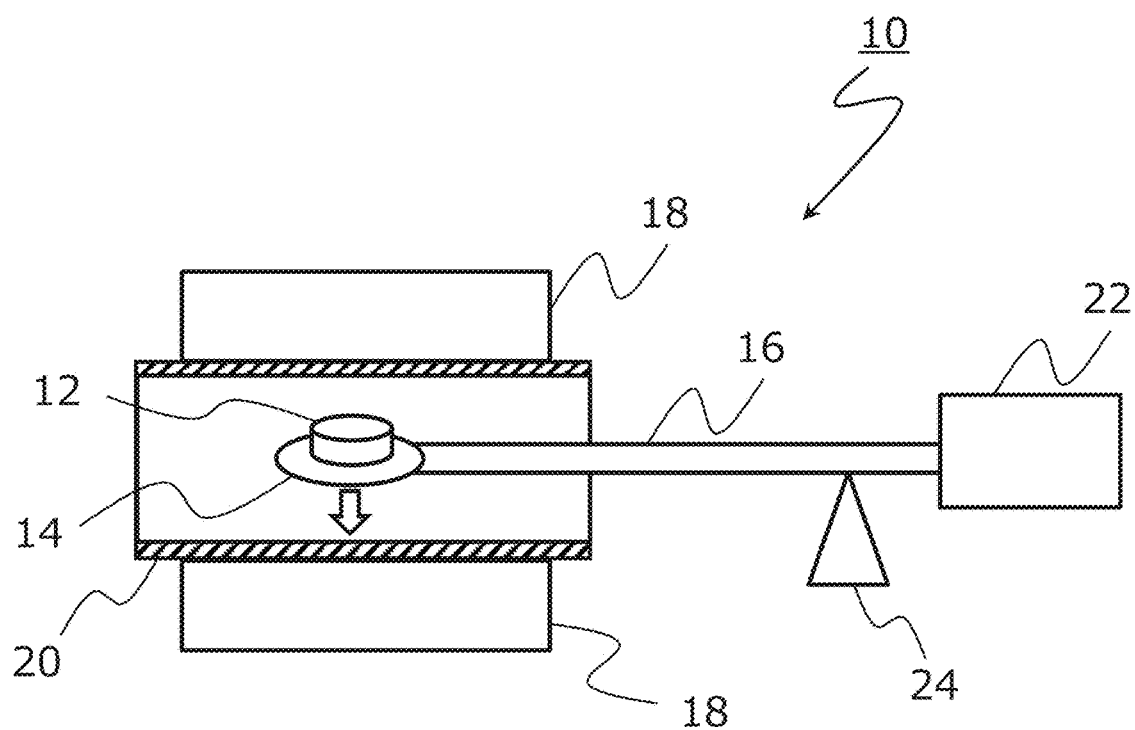
FIG. 2 is a schematic diagram showing an example of a TG (thermogravity) measuring device with a gradient magnetic field applied to a sample measurement section.

FIG. 2 is a schematic diagram showing an example of a TG measuring device with a magnetic gradient applied to a sample measurement section. The TG measuring device 10 of FIG. 2 includes a beam 16, which includes a holder 14 at one end for holding a sample 12 to be measured, an electric furnace 20, which includes a heater 18 for heating the sample 12, and a weight measuring unit 22 connected with the other end of the beam 16 for detecting the change in weight of the sample 12. The beam 16 is supported by a supporting section 24 that functions as the fulcrum.

In usual TG measuring devices, the weight measuring unit 22 measures the change in weight of the sample 12 which is caused by a reaction which occurs in the sample 12 when the sample 12 is heated, such as pyrolysis. In extracting the feature regarding the magnetic phase transition, a magnetic gradient is applied from the outside of the sample 12 in measurement. Accordingly, a magnetically attracting force is exerted on the sample 12 as illustrated by the open arrow in FIG. 2. As a result, the magnetically attracting force is added to the weight of the sample 12, so that the value of the "weight" measured by the weight measuring unit 22 can involve the magnetically attracting force exerted on the sample 12. The magnetically attracting force depends on the magnitude of "magnetization" of the sample 12. Thus, when a phase transition from ferromagnetism to paramagnetism occurs in the sample 12, the magnetization of the sample 12 sharply changes and, therefore, the phase transition can be detected as the change in "weight" measured by the weight measuring unit 22.

In the example of FIG. 2, the sample 12 and the weight measuring unit 22 are arranged in a horizontal direction, although they may be arranged in a vertical direction. The TG measuring device 10 can have an additional function capable of concurrently performing differential thermal analysis (DTA) or differential scanning calorimetry (DSC). In this case, the sample 12 and a comparative sample may be set in the measuring device for measurement. In the present embodiment, the comparative sample is preferably a paramagnetic material (a material which is not ferromagnetic over the entire measurement temperature range), such as alumina.

The configuration of magnetic field application for applying a magnetic gradient to the sample 12 is arbitrary so long as the reproducibility can be secured between measurements of samples. Such magnetic field application can be easily realized by incorporating a permanent magnet, such as rare earth magnet, in the measuring device. The largeness of the magnetic gradient may be appropriately selected according to the amount of the sample 12 or the like. According to one embodiment, the magnetic gradient may be about 0.1 mT/mm. As the magnetic gradient increases, the phase transition can be detected with higher sensitivity. Therefore, the magnetic gradient is preferably equal to or greater than 0.5 mT/mm, more preferably equal to or greater than 1 mT/mm.

The sample 12 can be placed in, for example, an alumina container (pan), and the pan can be set in the holder 14 of the TG measuring device 10. For example, a magnetically anisotropic material to be measured, such as Nd—Fe—B sintered magnet, for example, is measured while it is in a bulk form, the magnetically attracting force can vary depending on the orientation in which the material is set. To suppress such a variation, it is preferred that the sample 12 is pulverized and sieved to collect powder particles within a particular particle size range, and the collected powder is used as the sample 12. The pulverized particle size may be appropriately selected according to the material to be measured but is, in one embodiment, equal to or smaller than 500 μm. In the case of measuring a readily oxidizable material, the pulverized particle size may be greater such that the increase in weight due to oxidation of a sample to be measured, which is attributed to a very small amount of oxygen contained in an inert gas in measurement, can be suppressed.

The temperature dependence of the magnetically attracting force can be measured in at least one of the period of increasing the sample temperature and the period of decreasing the sample temperature. The atmosphere in the measurement can be appropriately selected according to the sample to be measured. When the sample to be measured is, for example, a readily oxidizable material such as rare earth magnet, an inert gas such as argon gas can be employed in order to avoid a weight change due to an oxidation reaction in the measurement or occurrence of a new ferromagnetic phase resulting from a reaction. Also, a getter material may be incorporated in the measuring device for removing impurities from the inert gas.

The thermomagnetic balance, such as TG measuring device, can additionally have a known automatic sample replacing function. In such an embodiment, the name of a sample to be measured and the information about the measurement conditions may be registered beforehand, so that the measurement can be automated, and a large number of measurements can be efficiently performed. Thus, extraction of the feature determined based on the temperature dependence of magnetization can contribute to easy acquisition of data without depending on the skills or subjective judgement of the measurer as compared with the conventional methods of acquiring the microstructure data, such as optical microscopy, SEM/EDX, EPMA, or analysis of the crystal structure based on diffraction peaks acquired by XRD.

Embodiments

Hereinafter, embodiments of the present disclosure is described. Note that, however, excessively detailed descriptions may sometimes be omitted. For example, detailed description of well-known matter in the art and redundant description of substantially equal elements may sometimes be omitted. This is for the sake of avoiding the following descriptions from being unnecessarily redundant and assisting one skilled in the art to easily understand the descriptions. Note that the present inventors provide the attached drawings and the following descriptions for the purpose of assisting one skilled in the art to sufficiently understand the present disclosure. However, the present inventors do not intend that these drawings and descriptions limit the subject matter recited in the claims. In the following descriptions, elements having like or similar functions are denoted by like reference signs.

The following embodiments are illustrative, and the technologies and techniques of the present disclosure are not limited thereto. For example, the numerical values, shapes, materials, steps, the order of the steps, the layout of a display screen, etc., which will be mentioned in the following embodiments are merely exemplary, and various modifications can be made thereto so long as they do not lead to technical contradictions. Also, one embodiment can be combined with another so long as the combination does not lead to technical contradictions.

[Basic Structure of Database]

A database of the present disclosure is capable of storing data associated with an identifier unique to each sample. The database is a set of data whose structure can be processed by a computer according to a program, and can be processed using a hardware resource, such as computers. The database includes, as its constituents, a variety of data stored in a storage. Therefore, hereinafter, for the sake of simplicity, a storage storing data of a database may be referred to as database. The structure of a database in the present disclosure is configured such that stored data include the first data that is representative of at least one of the composition data, the processing data and the property data for each sample, and the second data that is representative of the microstructure data for each sample. (See FIG. 1.) Each data is in a digital data format, but the content of that format is not particularly limited. In the present embodiment, the microstructure data include a feature determined based on the temperature dependence of magnetization for each sample. At least in this point, the database of the present embodiment is different from conventional databases. This feature can be measured by, for example, the measuring device described with reference to FIG. 2. As previously described, as to the feature determined based on the temperature dependence of magnetization, data can be easily acquired without depending on the skills or subjective judgement of the measurer as compared with conventional acquisition of microstructure data.

Examples of the feature determined based on the temperature dependence of magnetization include a feature regarding the magnetic phase transition. A specific example of the feature determined based on the temperature dependence of magnetization is at least one of a Curie temperature and a Néel temperature.

In one embodiment, the first data include, as the composition data, the type of elements contained in each sample and the composition ratio of the elements. The first data can include, as the processing data, parameters that define the conditions of a heat treatment performed in the process of producing each sample. The first data may further include, as the property data, at least one of the residual magnetic flux density, coercivity, saturation magnetization and magnetic permeability of each sample. On the other hand, the second data can include, as the microstructure data, parameters that define the crystal structure of a primary phase contained in each sample.

[Configuration of Material Data Processing System]

Figure 3:
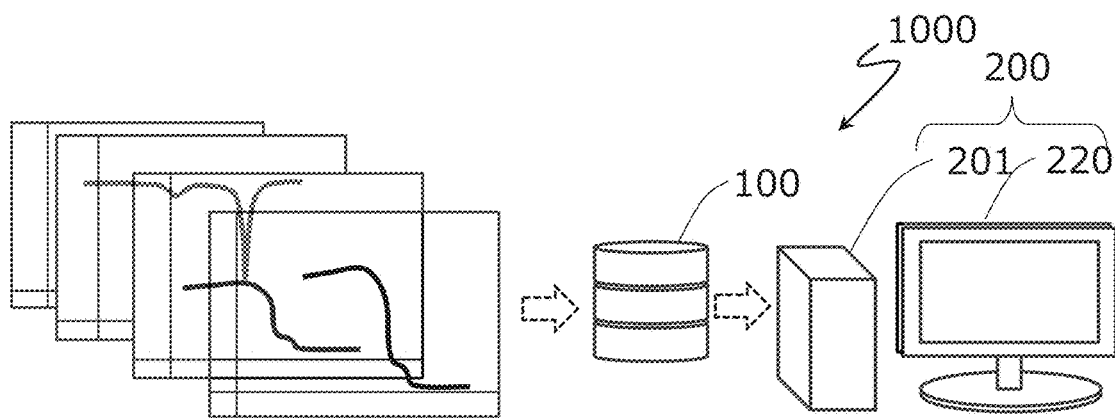
FIG. 3 is a diagram schematically showing a configuration example of a material data processing system according to an embodiment of the present disclosure.

FIG. 3 is a schematic diagram for illustrating the outline of a material data processing system of the present disclosure. A material data processing system 1000 according to the present embodiment includes a database 100 and a data processing device 200. The data processing device 200 is capable of accessing the database 100 to retrieve data therefrom. The data processing device 200 is configured to receive various inputs made by a user and provide outputs useful for development of novel or alternative materials.

The database 100 is stored in one or a plurality of storages, such as semiconductor memory, magnetic storage or optical storage, and has the above-described data structure. The storages that form the database 100 may be distributed at a plurality of different locations. The data contained in the database 100 include the first data and the second data of FIG. 1. The data stored in the database 100 can be acquired from, for example, each of actually produced materials using a device such as a measuring or testing device. Alternatively, these data may be collected from various information stored in other storages (e.g., literature information) via a network which will be described later.

The database 100 can accumulate a vast amount of data acquired during the phases of designing, development and production over a long period of time, for example, several years, 10 years, 20 years, or longer. If a consortium is established by material manufacturers or test equipment manufacturers and many companies have access to the database 100, a set of a vast amount of data collected from many companies can be managed as big data.

The data processing device 200 includes, for example, a main part 201 and a display device 220. The main part 201 of the data processing device 200 is implemented with software (or firmware) for use in searching through a vast amount of data accumulated in the database 100 for, for example, data associated with a material which has material properties similar to desired material properties. Such software can be sold in the form of packaged software, for example, a computer readable medium (e.g., optical disc) containing the software, or can be distributed through the Internet. Note that examples of the operations performed by the data processing device 200 will be described later in detail.

The display device 220 can be, for example, a liquid crystal display or an organic EL (Electro-Luminescence) display. The display device 220 is capable of displaying various information based on data output from the main part 201.

An example of the data processing device 200 is a personal computer or a tablet computer. The data processing device 200 may be a dedicated device that functions as a material data processing system.

Figure 4:
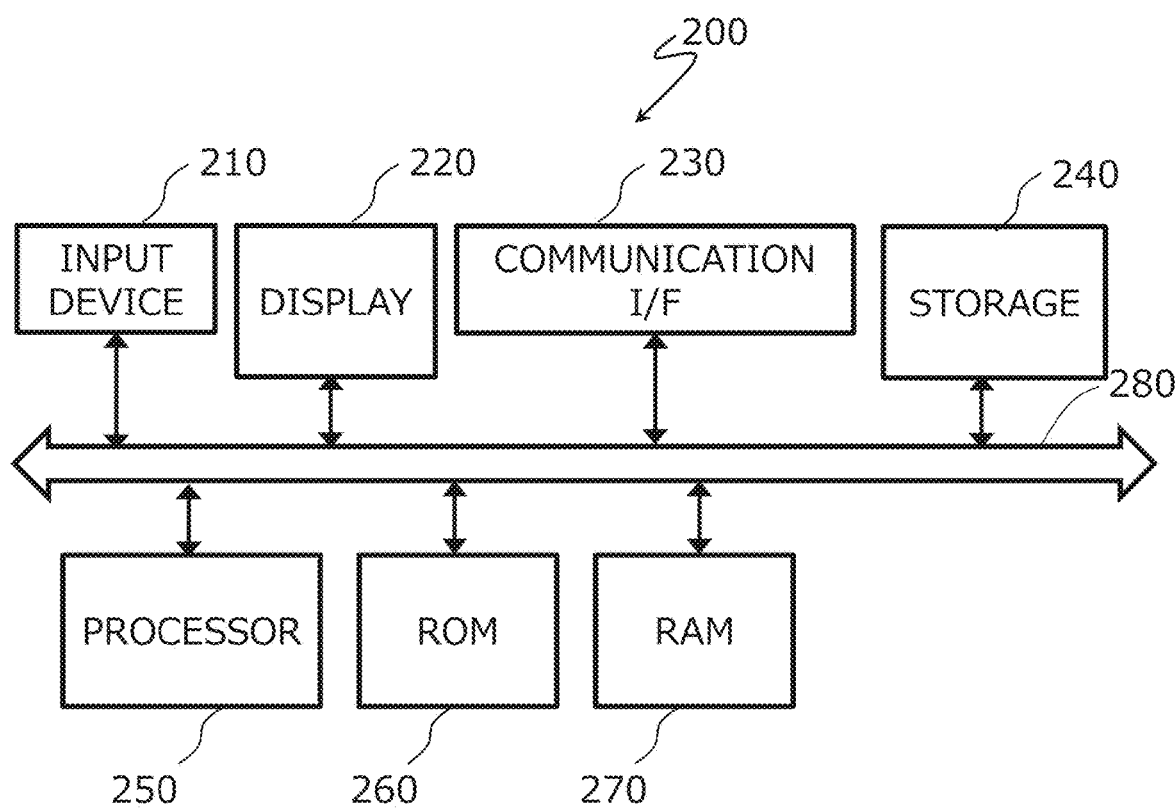
FIG. 4 is a block diagram showing a hardware configuration example of a data processing device 200.

FIG. 4 is a block diagram showing a hardware configuration example of the data processing device 200. The data processing device 200 includes an input device 210, a display device 220, a communication I/F 230, a storage 240, a processor 250, a ROM (Read Only Memory) 260 and a RAM (Random Access Memory) 270. These components are connected with one another via a bus 280.

The input device 210 converts an instruction from a user to data and inputs the data into the computer. The input device 210 is, for example, a keyboard, mouse or touch panel.

The communication I/F 230 is an interface for data communication between the data processing device 200 and the database 100. For example, the communication I/F 230 may be capable of wired communication in compliance with USB, IEEE 1394 (registered trademark) or Ethernet (registered trademark). The communication I/F 230 may be capable of wireless communication in compliance with the Bluetooth (registered trademark) standards and/or the Wi-Fi (registered trademark) standards. Both include the wireless communication standards which employ 2.4 GHz band frequencies.

The storage 240 is, for example, a semiconductor memory, magnetic storage or optical storage, or a combination thereof. An example of the optical storage is an optical disc drive. Examples of the magnetic storage include a hard disk drive (HDD) and a magnetic tape storage.

The processor 250 is one or a plurality of semiconductor integrated circuits, which may also be referred to as central processing unit (CPU) or microprocessor. The processor 250 sequentially executes computer programs stored in the ROM 260, which describe a group of instructions to search for optimum materials, and realize desired processes. The processor 250 is broadly interpreted to include FPGA (Field Programmable Gate Array) with an integrated CPU, GPU (Graphic Processer Unit), ASIC (Application Specific Integrated Circuit), and ASSP (Application Specific Standard Product).

The ROM 260 is, for example, a writable memory (e.g., PROM), rewritable memory (e.g., flash memory), or read-only memory. The ROM 260 stores a program for controlling the operation of the processor. The ROM 260 does not need to be a single storage medium but can be a set of storage media. Some of the set of storage media may be detachable memories.

The RAM 270 provides a work area in which a control program retrieved from the ROM 260 is to be expanded temporarily at boot time. The RAM 270 does not need to be a single storage medium but can be a set of storage media.

In the example of FIG. 3, the database 100 is hardware independent of the data processing device 200. However, a vast amount of data stored in a storage medium may be loaded into the main part 201 of the data processing device 200, so that the storage medium can function as the database 100.

Figure 5:
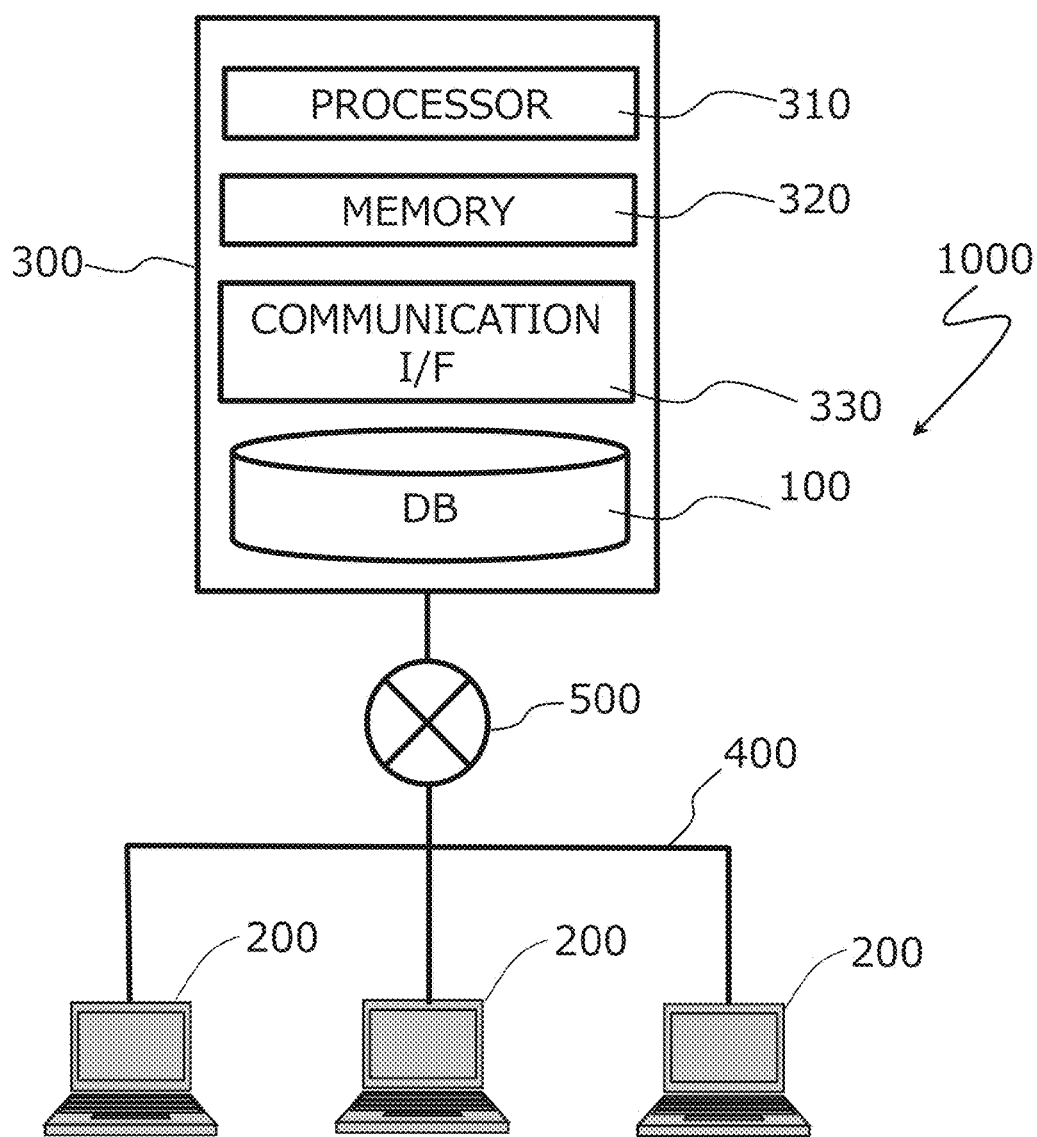
FIG. 5 is a block diagram showing a configuration example in which a cloud server 300 includes a database 100.

The database 100 may be stored in a cloud server. FIG. 5 is a block diagram showing a configuration example in which a cloud server 300 includes a database 100. In the example shown in FIG. 5, the material data processing system 1000 includes a plurality of data processing devices 200 and a database 100 stored in a cloud server 300. The cloud server 300 includes a processor 310, a memory 320, a communication I/F 330 and the database 100. The previously-described first and second data can be stored in the database 100 on the cloud server 300. The plurality of data processing devices 200 can be connected with one another via, for example, a local area network (LAN) 400 formed in a company. The local area network 400 is connected to the Internet 500 via an internet service provider (ISP). Each of the data processing devices 200 can access the database 100 of the cloud server 300 via the Internet 500.

In the example of FIG. 5, the processor 310 on the cloud server 300 may work instead of or in cooperation with the processor 250 included in the data processing device 200 (see FIG. 4) to execute arithmetic operations that are necessary for a process. Alternatively, a plurality of data processing devices 200 connected to the same LAN may cooperate to processing data.

Figure 6:
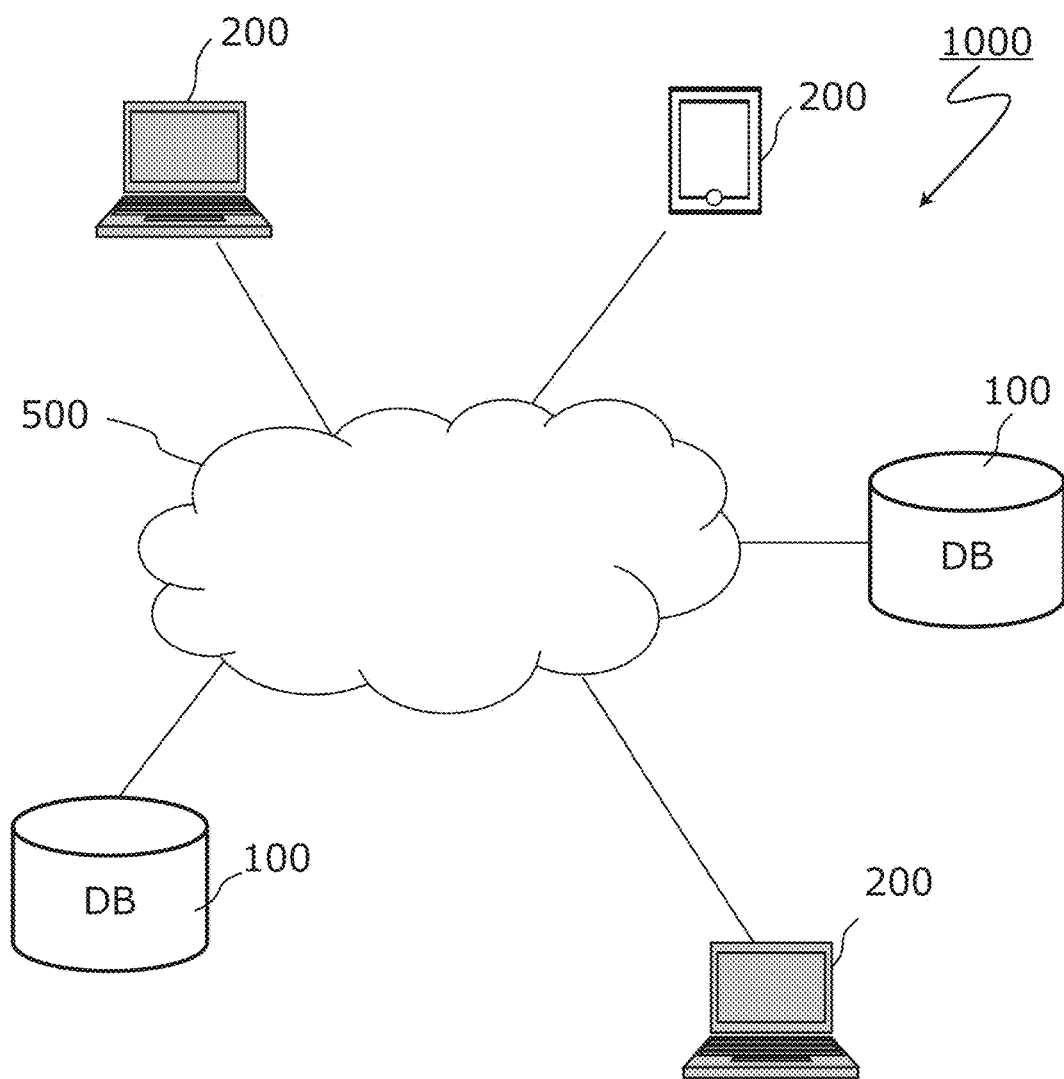
FIG. 6 is a diagram schematically showing an example of a material data processing system 1000 that includes a plurality of databases 100 and a plurality of data processing devices 200.

Thus, the material data processing system 1000 of the present embodiment does not need to be realized by hardware placed on a single site. Each of the database 100 and the data processing device 200 may be realized by a plurality of hardware resources distributed at different locations. FIG. 6 schematically shows an example of the material data processing system 1000 that includes a plurality of databases 100 and a plurality of data processing devices 200. In this example, the databases 100 and the data processing devices 200, which are distributed at different locations, are connected with one another via the Internet 500. Another network may be used instead of or together with the Internet 500.

An example of the method of creating the database 100 according to an embodiment of the present disclosure includes: collecting data of at least one of the composition, processing and property which are acquired for each sample, and data of the microstructure which are acquired for each sample; and storing the collected data in a storage. These data are associated with an identifier unique to each sample. The present disclosure is characterized in that, when the data include a feature determined based on the temperature dependence of magnetization which is acquired for the sample, this feature is associated at least as data of the microstructure with the identifier.

When the feature determined based on the temperature dependence of magnetization is put into the database, associating the feature as data of the microstructure with the identifier is indispensable, although this does not exclude associating the feature as a different type of data, such as property data, with the identifier.

Example 1 of Extraction of the Feature Determined Based on the Temperature Dependence of Magnetization Next, an example of extraction of the feature determined based on the temperature dependence of magnetization for a specific material is described with reference to FIG. 7A, FIG. 7B and FIG. 7C. Herein, a sample to be measured is a calcined material for a Ca—La—Co hexagonal ferrite magnet, which was produced under certain production conditions. This sample (calcined material) was produced by mixing raw materials, such as $Fe_2O_3$, CaO, $Co_3O_4$, etc., and sintering the mixture.

Figure 7A:
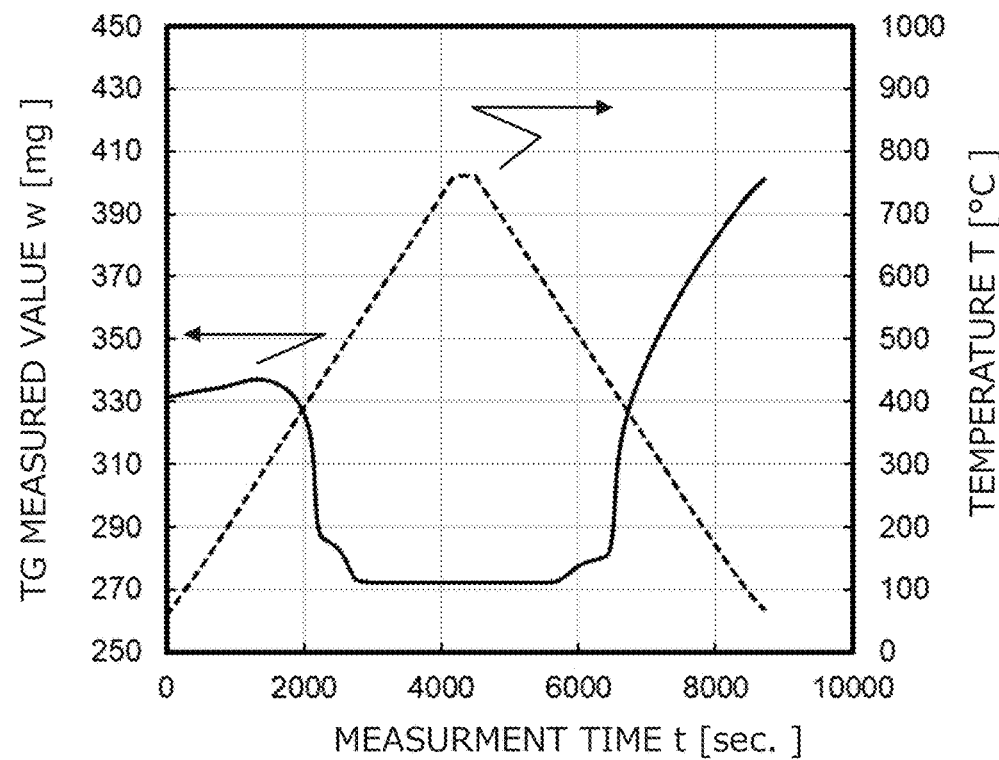
FIG. 7A is an example graph showing the temperature profile (broken line) and the measured value (solid line) of a thermogravity measuring device shown in FIG. 2.

FIG. 7A is an example graph showing the temperature profile (broken line) and the measured TG value (solid line) during TG measurement. The horizontal axis of the graph represents the measurement time t [seconds], the left vertical axis represents the measured TG value w [mg (milligrams)], and the right vertical axis represents the temperature T [° C.]. The measurement was performed using a system such as shown in FIG. 2. Herein, the temperature T was controlled by the heater of the TG measuring device. The data of FIG. 7A was acquired through a process where the temperature of the sample was increased from 50° C. to 750° C. at the rate of 10° C./minute and then maintained at 750° C. for 5 minutes, and thereafter, the temperature was decreased to 50° C. at the rate of −10° C./minute. The temperature T (broken line) shown in FIG. 7A was the temperature actually measured at a sample placement section in the TG measuring device. The measured TG value w was equal to the total of the weight of the calcined material (sample), the weight of the alumina container (pan), and the magnetically attracting force. The weight of the pan and the weight of the sample do not change depending on the temperature. Therefore, the change of the measured TG value w corresponds to the change of the magnitude of the magnetic force exerted on the sample, i.e., the change of the magnitude of the magnetization of the sample.

As seen from FIG. 7A, the measured TG value w sharply decreased in a period where the increasing temperature T exceeded about 300° C. and then increased to higher temperatures. During the increase of the temperature, after the temperature T has reached about 500° C., the decrease of the measured TG value w ceased, and the measured TG value w exhibited a generally constant value. This means that the increase of the temperature T causes the magnetization of the calcined material (sample) to decrease. The temperature profile was such that, when the time since the start of the measurement (measurement time) was less than about 4100 seconds, the temperature was increasing, but thereafter, the temperature began to decrease. During the decrease of the temperature, when the temperature T was lower than about 500° C., an increase of the measured TG value w was detected. This means that the decrease of the temperature T causes the magnetization of the calcined material (sample) to increase.

Figure 7B:
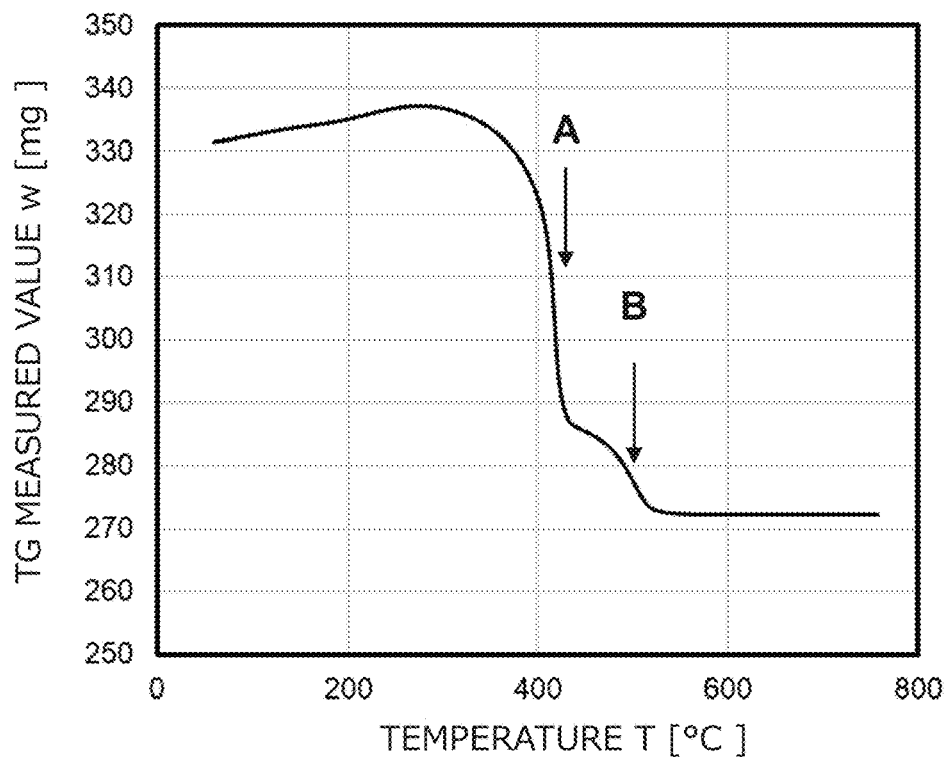
FIG. 7B is an example graph showing the temperature dependence of the measured TG value based on the measurement data of FIG. 7A.

FIG. 7B is a graph showing the temperature dependence of the measured TG value based on the measurement data of FIG. 7A. This graph shows a portion of the temperature-increasing period during the measurement (the temperature T ranging from room temperature to about 760° C.). The horizontal axis of the graph represents the temperature T, and the vertical axis represents the measured TG value w. In the graph of FIG. 7B, the measured TG value w sharply changes at the positions (temperatures) indicated by arrow A and arrow B. This sharp changes in the measured TG value (weight) were attributed to a ferromagnetic-paramagnetic phase transition of a phase (ferromagnetic phase) contained in the sample. The amount of the change in measured TG value (weight) reflected the magnetization and volume proportion of the ferromagnetic phase in the sample.

Figure 7C:
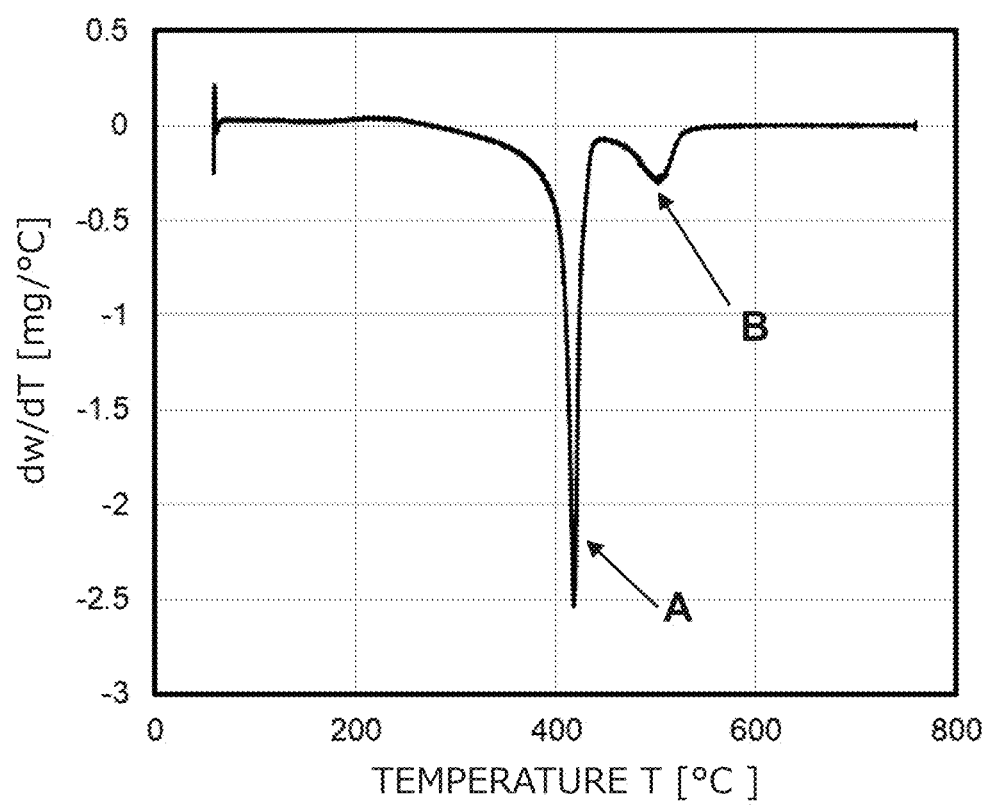
FIG. 7C is a graph showing the first derivative at the temperature of the curve of the measured TG value shown in FIG. 7B.

FIG. 7C is a graph showing the first derivative at the temperature T of the curve shown in FIG. 7B. The curve shown in FIG. 7C is the secondary data calculated from the primary data acquired by the measuring device. A feature extracted by analyzing this curve is also the secondary data. Hereinafter, an example of such a feature is described.

In FIG. 7C, arrow A and arrow B that are equivalent to arrow A and arrow B of FIG. 7B are shown at the same positions (temperatures). Temperatures at which the minima occurred (at the positions of arrow A and arrow B of FIG. 7C) can be defined as Curie temperatures ($T_c$). Note that the Curie temperatures ($T_c$) may be determined by any other method. It was ascertained from the results of an analysis by any other method, such as XRD, that a ferromagnetic-paramagnetic phase transition of a magnetoplumbite phase occurred at the position of arrow A, and a ferromagnetic-paramagnetic phase transition of a spinel phase occurred at the position of arrow B.

According to an embodiment of the present disclosure, the Curie temperature $T_c$ is used as a "feature" and, therefore, it is preferred that the procedure for acquiring a Curie temperature $T_c$ from various data is always the same. For example, temperatures at which minima of the peaks occur (indicated at the positions of arrow A and arrow B of FIG. 7C) may be defined as Curie temperatures $T_c$, or Curie temperatures $T_c$ may be determined by any other analysis method. The value of a Curie temperature $T_c$ acquired through a certain procedure may be different between the increasing-temperature side and the decreasing-temperature side of the sample in the measurement or may vary depending on the difference in the temperature increase rate. When the feature determined based on the temperature dependence of magnetization for each sample, such as Curie temperature $T_c$, is registered in a database as information that define the "microstructure" of the material, it is useful to unambiguously determine the measurement conditions and/or which portion is to be used in the analysis (particularly, whether the portion used in the analysis is a part of the temperature-increasing period or the temperature-decreasing period). The information about the measurement conditions may be stored as metadata in the database.

Extraction of the feature may be performed separately for each piece of data or may be automatically performed using an analysis program. The primary data (raw data) acquired by measurement, or the feature acquired by analyzing the primary data, such as Curie temperature $T_c$, may be processed using a workflow system where the data are automatically registered in a database, which will be described later. Alternatively, each piece of data may be separately registered according to instructions input from a terminal device.

Example 2 of Extraction of the Feature Determined Based on the Temperature Dependence of Magnetization Next, another example of extraction of the feature determined based on the temperature dependence of magnetization is described with reference to FIG. 8A and FIG. 8B. In the example described herein, measurement and analysis are performed on a (Y, Sm)(Fe, Co, Ti)$_{12}$ based alloy, which is a ThMn$_{12}$-type compound. The (Y, Sm) (Fe, Co, Ti)$_{12}$ based alloy is a promising material for a high-performance permanent magnetic material having a low rare earth composition.

Figure 8A:
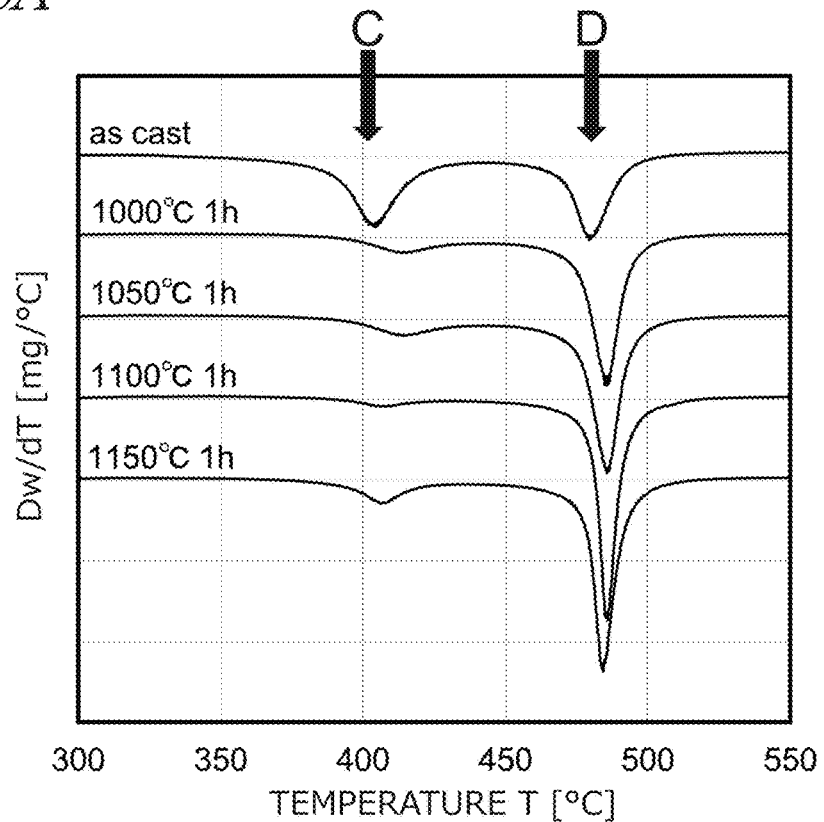
FIG. 8A is a graph showing the temperature dependence of a value obtained by differentiating the measured TG value by the temperature for $Y_{3.1}Sm_{5.3}Fe_{69.2}Co_{13.9}Ti_{4.1}Cu_{4.5}$ alloy samples treated under different heat treatment conditions in the production process.

FIG. 8A is a graph showing the temperature dependence of a value obtained by differentiating the measured TG value by the temperature for Y$_{3.1}$Sm$_{5.3}$Fe$_{69.2}$Co$_{13.9}$Ti$_{4.1}$Cu$_{4.5}$ alloy samples treated under different heat treatment conditions in the production process. The horizontal axis of this graph represents the sample temperature during the measurement, and the vertical axis represents a value obtained by differentiating the measured TG value (weight) by the temperature. To clearly discern the difference in data between the samples, the lines of the data were drawn from the origins at different heights. The graph of FIG. 8A shows only a range of the sample temperature from 300° C. to 550° C.

The curves shown in FIG. 8A have two peaks as indicated by arrow C and arrow D. The peaks at arrow D are attributed to a ferromagnetic-paramagnetic phase transition of the ThMn$_{12}$-type compound phase, which is the primary phase. On the other hand, it is estimated from literature or the like that the peaks at arrow C are attributed to a ferromagnetic-paramagnetic phase transition of the Th$_2$Ni$_{17}$-type compound phase and/or Nd$_3$ (Fe$_{1-x}$Ti$_x$)$_{29}$-type compound phase. Herein, the Th$_2$Ni$_{17}$-type compound phase has broken periodicity in the dumbbell structure of Fe, i.e., can include a so-called "disorder 2-17 phase." In these phases, the XRD diffraction peak is quite similar to the XRD diffraction peak of the ThMn$_{12}$-type compound phase and, therefore, for example, in the "1100° C. 1 h" sample, the presence of the phases may be difficult to confirm only by usual XRD measurement. However, so long as it is based on the temperature dependence of magnetization such as shown in FIG. 8A, acquisition of information clearly observable as the feature is possible.

In FIG. 8A, the positions (temperatures) of the peaks at arrow C and arrow D vary depending on the heat treatment conditions. FIG. 8B is a graph where the vertical axis represents the temperature at which the peak of arrow D occurred (the Curie temperature $T_c$ of the ThMn$_{12}$-type compound phase) and the horizontal axis represents the heat treatment temperature. To precisely determining the peak position (i.e., $T_c$), removing the effects of minute noise in the measurement is preferred. To remove such effects of noise, for example, leveling the curves of FIG. 8A using moving average values of the data is preferred.

Figure 8B:
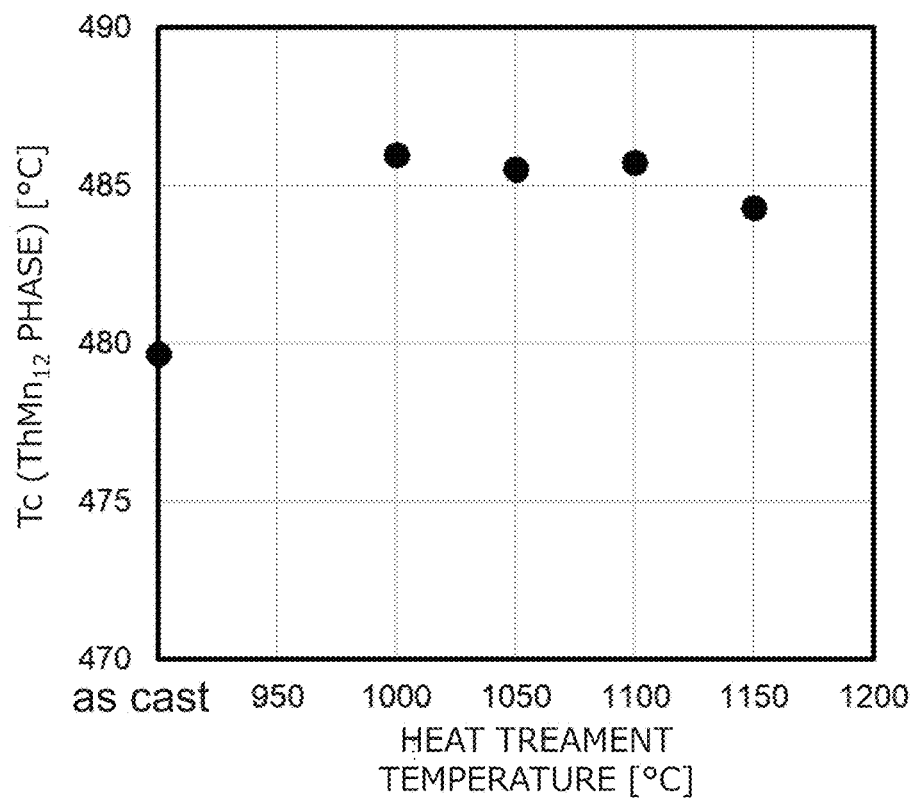
FIG. 8B is a graph where the vertical axis represents the temperature at which the peak of arrow D occurred (the Curie temperature $T_c$ of the $ThMn_{12}$-type compound phase) and the horizontal axis represents the heat treatment temperature.

As seen from FIG. 8B, the Curie temperatures $T_c$ are quite different between the as-cast sample, which was not subjected to a heat treatment, and the other heat-treated samples. The as-cast sample and the sample heat-treated at 1100° C. were analyzed with SEM/EDX. The mole fraction of Ti with respect to (Fe+Co+Ti+Cu) of the ThMn$_{12}$-type compound phase was 0.048 in the as-cast sample, while 0.060 in the sample heat-treated at 1100° C. In this way, we ascertained that the difference in Curie temperature $T_c$ between these samples reflected the composition ratio of the ThMn$_{12}$-type compound phase contained in the sample alloy.

Thus, the feature determined based on the temperature dependence of magnetization is effective as the data representative of the information about the microstructure.

The feature determined based on the temperature dependence of magnetization is not limited to the "feature regarding the magnetic phase transition," which includes at least one of a Curie temperature and a Néel temperature, such as illustrated in the previously-described examples. For example, the "feature determined based on the temperature dependence of magnetization" may be a function that approximates the entirety or a part of the shape of the curves shown in the graphs of FIG. 7A, FIG. 7B and FIG. 7C and FIG. 8A.

<Method of Creating Database>

A method of creating a database according to the present embodiment includes: collecting data of at least one of the composition, processing and property which are acquired for each sample (first data) and data of the microstructure which are acquired for each sample (second data); and storing the collected data in a storage. Herein, the step of storing the collected data in a storage is equivalent to the act of inputting (registering) the data in a database. The above-described data are each associated with an identifier. It is particularly important in an embodiment of the present disclosure that, when the above-described data include the feature determined based on the temperature dependence of magnetization which is acquired for a sample, the feature is associated as data of the microstructure with an identifier.

For example, when the above-described data include a feature included in the microstructure data, such as Curie temperature $T_c$, this feature is associated as data of the microstructure with an identifier when registered together with other data in a database. Hereinafter, this point is specifically described.

FIG. 9A, FIG. 9B, FIG. 9C and FIG. 9D together show an example of parts of a table illustrating a structure example of data registered in a database. The table has a plurality of rows and a plurality of columns. The data of each sample are gathered in a single row. Thus, as the number of samples registered in the database increases, the number of rows included in the table also increases. Note that the data shown in FIG. 9A, FIG. 9B, FIG. 9C and FIG. 9D merely illustrate a structure example of the database, and the numerical values shown in the table are not values measured in experiments.

Figure 9A:
FIG. 9A is a diagram showing an example of parts of a table that shows items to be registered in a database according to an embodiment of the present disclosure.
Figure 9B:
FIG. 9B is a diagram showing an example of parts of a table that shows items to be registered in a database according to an embodiment of the present disclosure.
Figure 9B:

The right-end column of the table of FIG. 9A continues to the left-end column of the table of FIG. 9B as illustrated by large solid arrows. Likewise, the right-end column of the table of FIG. 9B continues to the left-end column of the table of FIG. 9C as illustrated by large solid arrows. Further, the right-end column of the table of FIG. 9C continues to the left-end column of the table of FIG. 9D as illustrated by large solid arrows. The tables shown in these drawings merely illustrate an example of the structure of the database of the present embodiment, to which the structure of the database of the present disclosure is not limited.

Each of the samples, for which the data are registered in the database, is provided with a unique identifier (ID) as shown in the table of FIG. 9A. In this example, each sample is provided with a number for specifying the "Experiment No." The form of a mark used as the identifier is arbitrary.

Each piece of the data is associated with an identifier when registered in the database. According to an embodiment of the present disclosure, as previously described, the data to be registered can be classified into categories such as "composition data," "processing data," "microstructure data," "property data," etc. Specifically, the composition data are recorded in the "Composition" column in the table of FIG. 9A. The processing data are recorded in the "Production Conditions" column in the table of FIG. 9B. The microstructure data are recorded in the "Microstructure" column in the table of FIG. 9C. The property data are recorded in the "Property" column in the table of FIG. 9D.

In the "Composition" and "Processing" columns, the composition of starting materials and/or the conditions set in respective steps of a production process can be registered based on the details of experiments or test production. The conditions set in respective steps can include other conditions, for example, the type and amount of an assisting agent for sintering of a ceramic material.

In the "Property" column, information about the properties of the final product material, i.e., the specifications of the product, are stored. For example, in the case of a permanent magnet, the information about the residual magnetic flux density (remanence) $B_r$, the coercivity $H_{cJ}$, and the maximum magnetic energy product $(BH)_{max}$ are stored in this column. Note that, according to the present invention, the Curie temperature $T_c$ is used as an index representative of the "microstructure," although this does not mean that the Curie temperature $T_c$ is inevitably excluded from the "material properties."

As shown in FIG. 9C, in the "Microstructure" column, the feature regarding the magnetic phase transition is stored without fail. This means that, for example, when the "feature regarding the magnetic phase transition" such as Curie temperature $T_c$ is input to the database, the structure of the database shows that the input "feature regarding the magnetic phase transition" is "microstructure data."

In the "Microstructure" column, the type and lattice constant of each phase determined from the results of XRD measurements and the phase transition temperature measured by DTA or DSC can also be stored. Other features relevant to the "microstructure," such as image data acquired by SEM/EDX and a feature derived from the composition data, may also be stored in the "Microstructure" column.

The feature regarding the magnetic phase transition is not limited to a single feature for each sample. In the example of FIG. 9C, the feature regarding the magnetic phase transition includes the first Curie temperature Tc(1) and the second Curie temperature Tc(2).

In the present embodiment, the category of the "microstructure data," in which the feature regarding the magnetic phase transition is stored, is indispensable although any of the categories of the "composition data," "processing data" and "property data" is not necessarily needed. In addition to the information (e.g., numerical values) to be registered in these categories, for example, information derived from data of a measuring device attached to a production device during production of samples may be registered in the database as data of a different category from those described above.

It is not required for all of the data included in the tables illustrated in FIG. 9A, FIG. 9B, FIG. 9C and FIG. 9D to be stored in a single storage. The data may be stored in different storages or data servers distributed at a plurality of locations so long as they are associated with identifiers.

Figure 10:
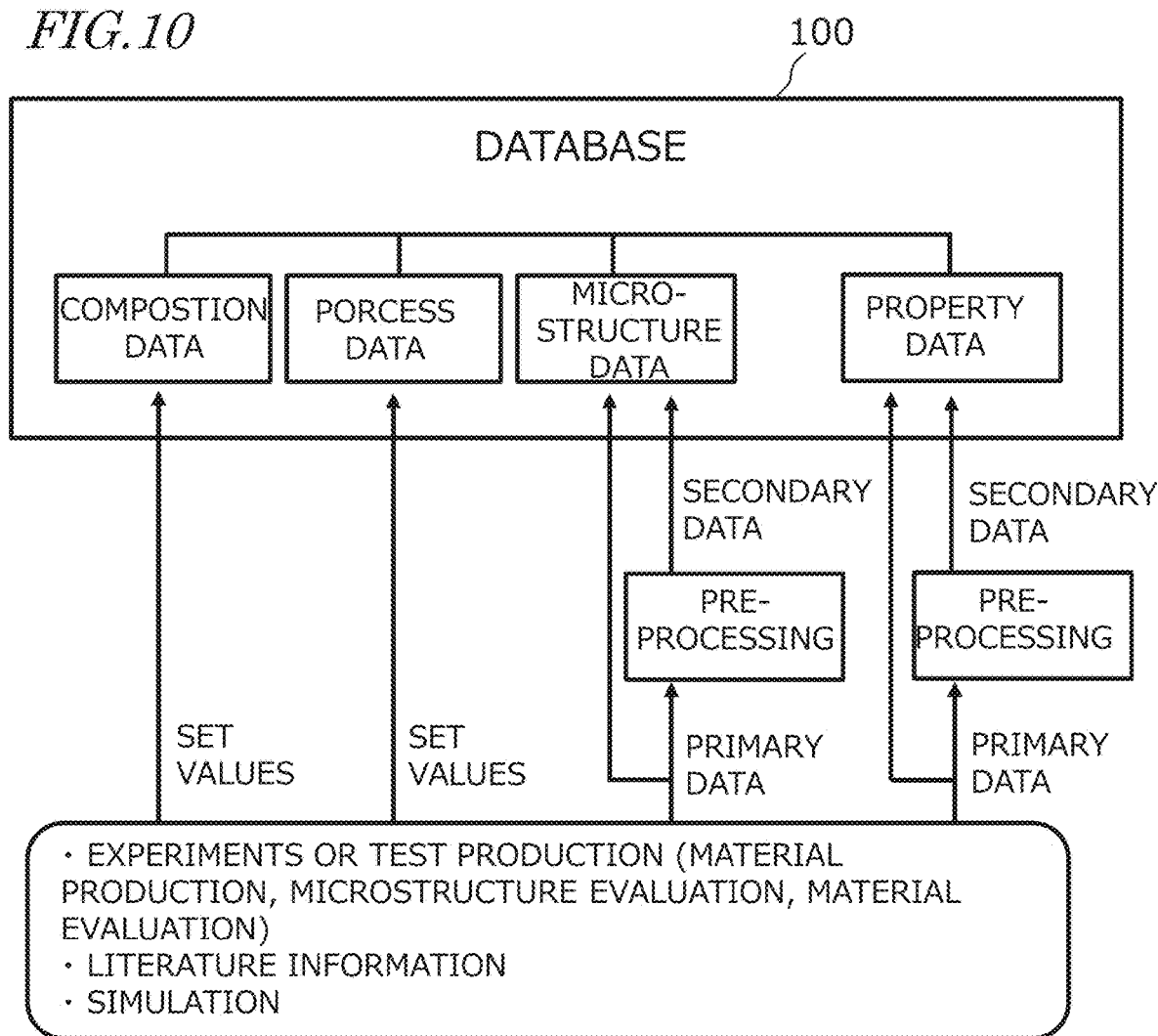
FIG. 10 is a diagram schematically showing an example of the process of registering various data in a database according to an embodiment of the present disclosure.

Next, an example of the process of registering various data in the database 100 according to the present embodiment is described with reference to FIG. 10. Examples of the data to be registered in the database 100 include, as shown in FIG. 10, data (measurement data) acquired by experiments or test production for material production, microstructure evaluation or material evaluation, and features extracted from such measurement data. Examples of the data to be registered can further include information obtained from literature and results of simulations.

In FIG. 10, examples of the "composition data" and the "processing data" input to the database 100 are values set for execution of the aforementioned experiments or test production. Meanwhile, examples of the "microstructure data" and the "property data" input to the database 100 are not limited to the primary data acquired from experiments or test production but can include the secondary data acquired by data preprocessing. For example, when specific numerical values are acquired by measurement, such as the density measured by Archimedes method, the numerical values as measured may be input (registered) as the primary data into the database. Herein, the "data preprocessing" can include various processes including, for example, smoothing, peak extraction, and extraction of features by an analysis. Extraction of a feature (secondary data) by analyzing the primary data (raw data) as previously described with reference to FIG. 7C may be performed as the "data preprocessing." In that case, the secondary data after the data preprocessing may be input (registered) into the database.

When the secondary data are input to the database 100, it is useful to associate the primary data (raw data) as the metadata with the secondary data and store the associated primary data in the database. Further, data acquired by calculation with the use of a plurality of pieces of primary data and/or secondary data, for example, the density calculated from the dimensions and the weight, may be registered in the database. A parameter, or a set of parameters, which defines a curve of data acquired by measurement (FIG. 7A, FIG. 7B, FIG. 7C, FIG. 8A) may be registered as a feature of the microstructure data in the database. Such a feature can include a feature which cannot be expressed by a known term such as, for example, "Curie temperature."

<Configuration of Material Data Processing System>

The material data processing system 1000 according to an embodiment of the present disclosure includes at least one database 100 and a data processing device 200 capable of accessing the database 100 to retrieve data therefrom, as previously described with reference to FIG. 3, FIG. 5 and FIG. 6. The data processing device 200 is capable of performing the operations of various data processing using the above-described data as will be described in examples below.

By data processing performed on the data registered in the database 100, the data in the database 100 are used in an analysis with the use of data-scientific techniques, such as visualization or machine learning. When the primary data as acquired represent features, the primary data can be used as they are. A quantity calculated from different primary data, for example, the density of a material calculated from the dimensions and the weight may be used as a feature in the analysis. When the primary data are spectrums or hysteresis curves, a feature derived from such primary data, such as Curie temperature $T_c$, can be used in the analysis.

Specifically, the material data processing system 1000 according to an embodiment of the present disclosure is configured to generate an output value from an input value based on a mathematical model and output the generated output value. The mathematical model includes the first variable defined by at least one of the composition data, the processing data and the property data of a material and the second variable defined by the microstructure data of the material, and the second variable can include a feature determined based on the temperature dependence of magnetization.

Figure 11:
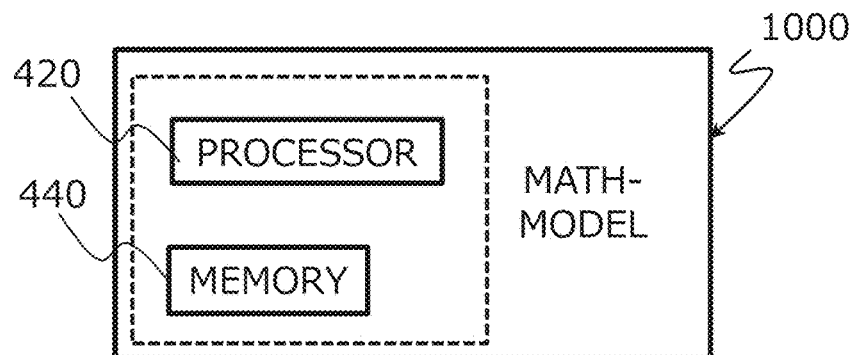
FIG. 11 is a diagram schematically showing a basic configuration example of a material data processing system according to an embodiment of the present disclosure.

The functional block of the thus-configured material data processing system 1000 can be realized by inclusion of a processor 420 and a memory 440 connected to the processor 420 as shown in FIG. 11. The memory 440 stores a program that defines the operation of the processor 420. The processor 420 executes arithmetic operations based on the "mathematical model" according to the program stored in the memory 440.

The mathematical model can be constructed using a certain algorithm for an explanatory variable of interest and an objective variable of interest. The algorithm for constructing the mathematical model can be realized by applying statistical methods and machine learning methods, such as local regression, random forests, support vector machines, neural networks, etc. The mathematical model may be constructed beforehand using the data stored in the database 100 shown in FIG. 3, FIG. 5 and FIG. 6, or may be constructed at the timing of selecting input data and output data. The mathematical model may be appropriately modified as the data registered in the database 100 accumulate.

The mathematical model is defined by the program (algorithm) stored in the memory 440 of FIG. 11 and a set of numerical parameters (e.g., weighting coefficients of neural networks) stored in the memory 440. Such an algorithm can be configured to determine the output value, which is at least one variable that defines the composition, processing, properties and microstructure of a material, from the input value, which is at least one variable that defines the composition, processing, properties and microstructure of the material. The set of numerical parameters that are necessary for specifying the mathematical model can be expanded over a plurality of computers via a communication line or storage medium.

The thus-configured material data processing system 1000 can function as a "material property prediction system," "physical property prediction system" or "material designing system."

First Example of Material Data Processing System

Figure 12:
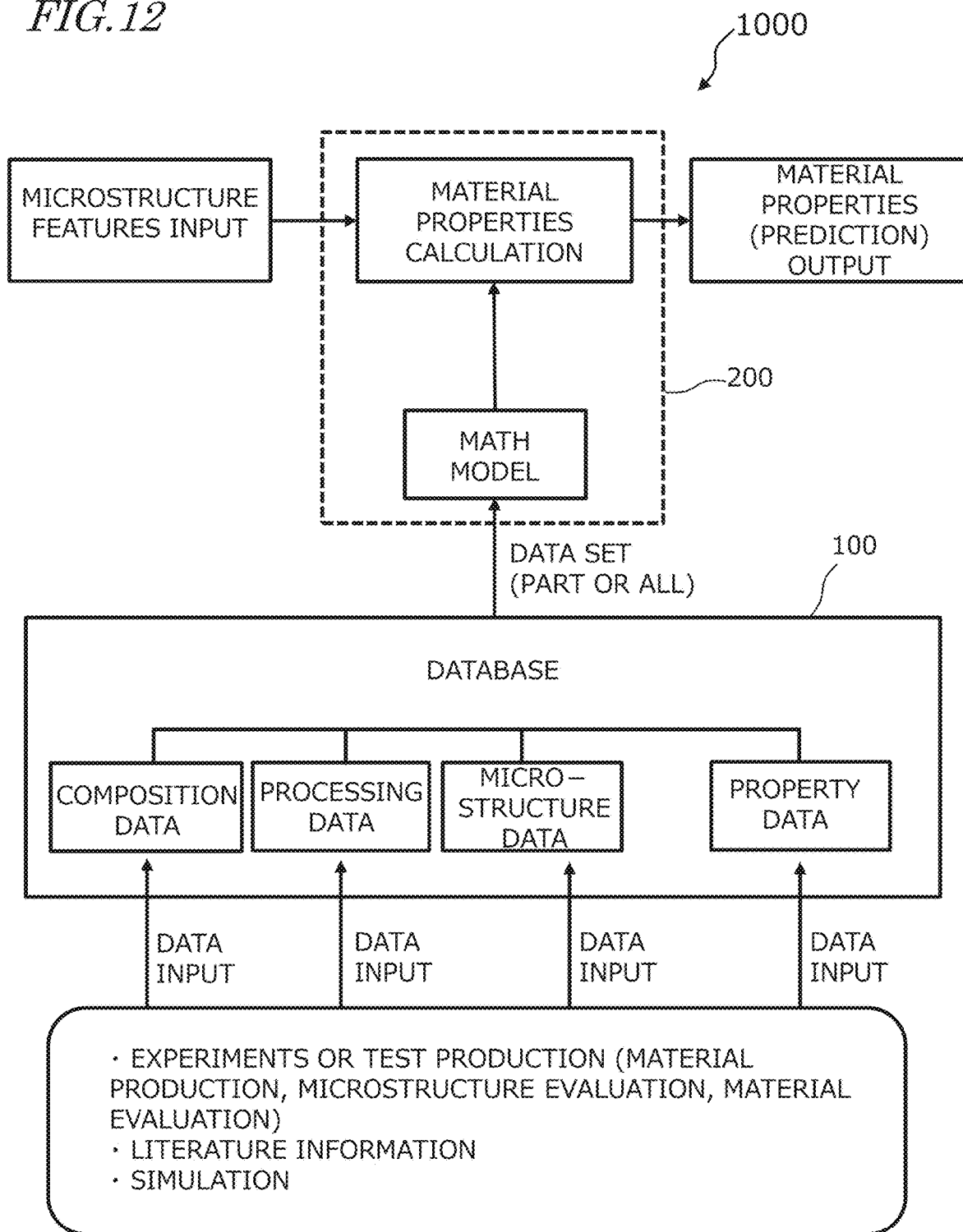
FIG. 12 is a functional block diagram showing an example of data processing in the first example of the material data processing system according to an embodiment of the present disclosure.

First, the first example of the material data processing system 1000 is described with reference to FIG. 12. FIG. 12 is a functional block diagram showing an example of data processing in the first example. The database 100 of FIG. 12 is a database created by input (registration) of data, which has previously been described with reference to FIG. 10. "DATA INPUT" in FIG. 12 corresponds to input of "SET VALUES," "PRIMARY DATA" and "SECONDARY DATA" into the database 100 in FIG. 10.

In the first example, the data processing device 200 derives and configures a mathematical model from a data set that includes a part or all of the data stored in the database 100, where one or a plurality of features registered in the "microstructure" category, which include the feature regarding the magnetic phase transition, such as for example Curie temperature $T_c$, are explanatory variables, and one or a plurality of features registered in the "properties" category are objective variables. Thus, the data processing device 200 can also function as a mathematical model configurator.

When "microstructure feature" values newly acquired in experiments or the like are input to the data processing device 200, the data processing device 200 outputs predicted values of the "material properties" using the mathematical model constructed as described above. Specifically, in the data processing device 200 that has a hardware configuration such as shown in FIG. 4, for example, the processor 250 executes arithmetic operations using the mathematical model based on values of the "microstructure features" input via the input device 210 of FIG. 4, and prediction results of the "material properties," which are obtained as the result of the arithmetic operations, can be displayed on, for example, the display device 220.

In this example, the data processing device 200 of FIG. 12 derives a mathematical model using the data of the database 100 and executes calculation of the material properties based on the mathematical model. However, the data processing device 200 may obtain a mathematical model derived by another data processing device 200 by communication and execute calculation of the material properties based on the mathematical model.

It is indispensable for the microstructure data in the database 100 which are used in deriving the mathematical model to include the feature determined based on the temperature dependence of magnetization. However, when the data processing device 200 performs calculation of the material properties using the mathematical model thus derived with the use of the database 100, it is not necessarily required that the input features of the microstructure include the feature determined based on the temperature dependence of magnetization. In the process of constructing a mathematical model for estimating output values from input values by learning, the features of the microstructure include the feature determined based on the temperature dependence of magnetization, so that the effect of improving the prediction accuracy of the mathematical model and the effect of reducing the amount of data required for derivation of the mathematical model can be expected. When the thus-derived mathematical model is used in calculating the material properties, it is desired that the input features of the microstructure include the feature determined based on the temperature dependence of magnetization. However, even if the feature determined based on the temperature dependence of magnetization is not included, prediction of the material properties is possible.

Second Example of Material Data Processing System

Figure 13:
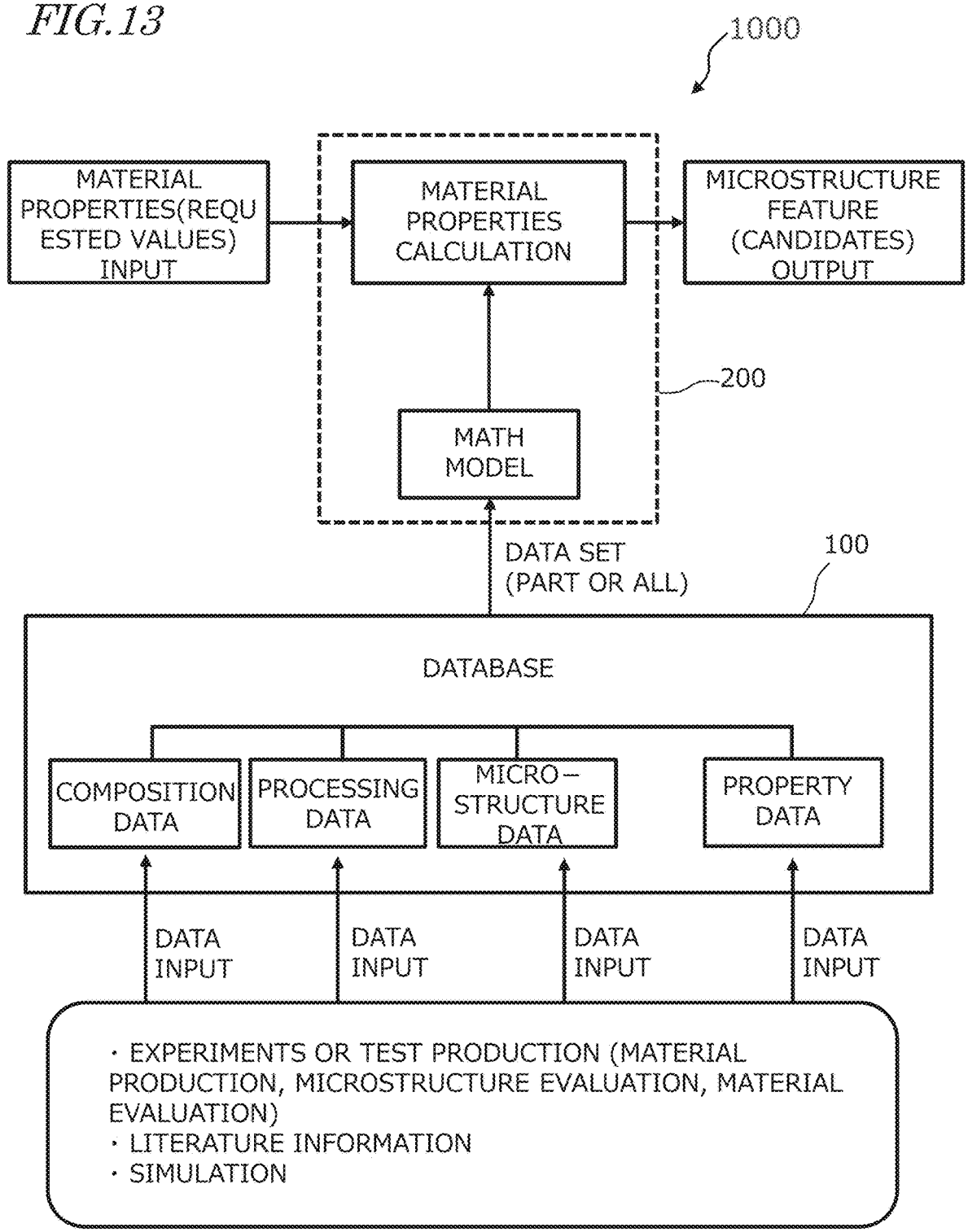
FIG. 13 is a functional block diagram showing an example of data processing in the second example of the material data processing system according to an embodiment of the present disclosure.

Next, the second example of the material data processing system 1000 is described with reference to FIG. 13. FIG. 13 is a functional block diagram showing an example of data processing in the second example. In this example, the data processing device 200 derives and configures a mathematical model from a data set that includes a part or all of the data stored in the database 100, where one or a plurality of features registered in the "microstructure" category, which include the feature regarding the magnetic phase transition, such as Curie temperature $T_c$, are explanatory variables, and one or a plurality of features registered in the "properties" category are objective variables.

When values of requested material properties (requested values) are input to the data processing device 200, the data processing device 200 solves an inverse problem by a known method using the mathematical model as constructed above and outputs candidates for the "microstructure features." Specifically, the processor 250 of the data processing device 200 performs arithmetic operations using the mathematical model based on requested values of the material properties input via the input device 210 or the like, and candidates for the "microstructure features," which are obtained as the result of the arithmetic operations, can be displayed on the display device 220 or the like.

Instead of solving an inverse problem, a mathematical model may be derived and configured from a data set that includes a part or all of the data stored in the database 100, where one or a plurality of features registered in the "properties" category are explanatory variables, and one or a plurality of features registered in the "microstructure" category, which include the feature regarding the magnetic phase transition, such as Curie temperature $T_c$, are objective variables. When such a mathematical model is derived and configured, by solving a direct problem or forward problem, it is possible to obtain, from an input of a "property" to be achieved, an output of a candidate for the "microstructure" which is required for realization of that property.

Third Example of Material Data Processing System

Figure 14:
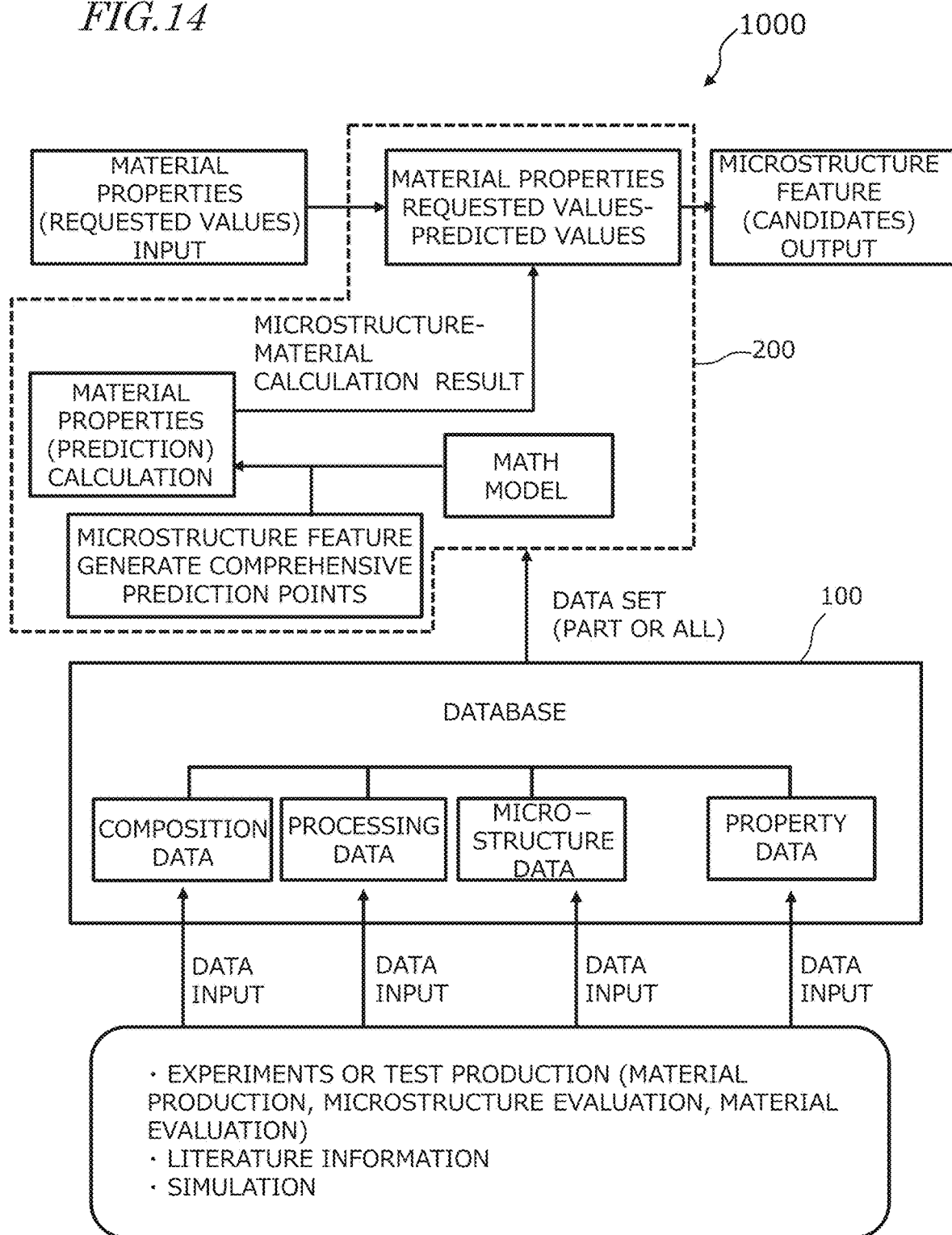
FIG. 14 is a functional block diagram showing an example of data processing in the third example of the material data processing system according to an embodiment of the present disclosure.

Next, the third example of the material data processing system 1000 is described with reference to FIG. 14. FIG. 14 is a functional block diagram showing an example of data processing in the third example. In this example, the data processing device 200 derives and configures a mathematical model from a data set that includes a part or all of the data stored in the database 100, where one or a plurality of features registered in the "microstructure" category, which include the feature regarding the magnetic phase transition, such as Curie temperature $T_c$, are explanatory variables, and one or a plurality of features registered in the "properties" category are objective variables.

Next, as for one or a plurality of items registered in the "microstructure" category, which include the feature regarding the magnetic phase transition, such as Curie temperature $T_c$, comprehensive prediction points of the microstructure features are generated. Then, predictive values of the material properties are calculated using the previously-described mathematical model for one or more of the items registered in the "properties" category corresponding to the generated prediction points.

Thereafter, when values of "material properties" to be achieved (requested values) are input to the data processing device 200, values closer to the input requested values are extracted from a series of resultant predicted values of one or a plurality of features registered in the "properties" category and output as "microstructure" candidates to the display device 220 of FIG. 4, for example. The difference between the requested values and the predicted values, which is the criterion for judgment about the extraction, is appropriately determined according to its purpose. In this example, the data processing device 200 of FIG. 14 derives a mathematical model using the data of the database 100 and executes, based on that mathematical model, generation of comprehensive prediction points of the microstructure features, (predictive) calculation of the material properties, and comparison between the requested values and the predicted values of the material properties. Alternatively, the data processing device 200 may obtain a mathematical model derived by another data processing device 200 by communication and execute, based on that mathematical model, generation of comprehensive prediction points of the microstructure features, (predictive) calculation of the material properties, and comparison between the requested values and the predicted values of the material properties.

The predicted values of the material properties, which are calculated using the mathematical model and the comprehensive prediction points of the microstructure features, may be stored beforehand in the database 100 or in another storage.

Fourth Example of Material Data Processing System

Figure 15:
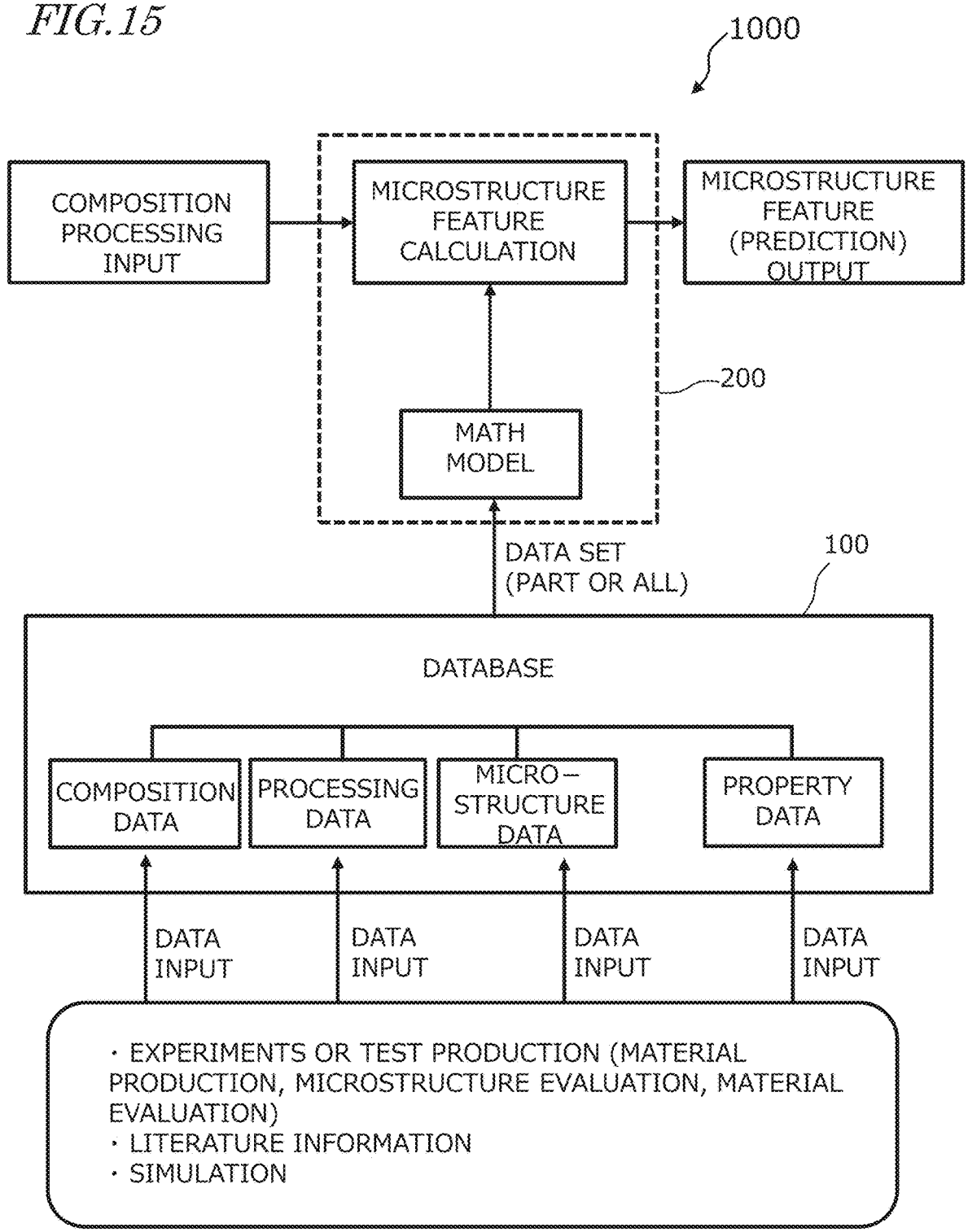
FIG. 15 is a functional block diagram showing an example of data processing in the fourth example of the material data processing system according to an embodiment of the present disclosure.

Next, the fourth example of the material data processing system 1000 is described with reference to FIG. 15. FIG. 15 is a functional block diagram showing an example of data processing in the fourth example. In this example, the data processing device 200 derives and configures a mathematical model from a data set that includes a part or all of the data stored in the database 100, where one or a plurality of features registered in the "composition" category and/or the "processing" category are explanatory variables, and one or a plurality of features registered in the "microstructure" category, which include the feature regarding the magnetic phase transition, such as Curie temperature $T_c$, are objective variables.

The thus-obtained mathematical model is used to output predicted values of the "microstructure" from the "composition and material processing" newly set in experiments or the like. Specifically, the processor 250 of the data processing device 200 performs arithmetic operations using the mathematical model based on values of the composition and processing input via the input device 210 or the like, and predicted values of the microstructure, which are obtained as the result of the arithmetic operations, can be displayed on the display device 220 or the like.

In this example, the data processing device 200 of FIG. 15 derives a mathematical model using the data of the database 100 and executes microstructure calculations based on that mathematical model. Alternatively, the data processing device 200 may obtain a mathematical model derived by another data processing device 200 by communication and execute microstructure calculations based on that mathematical model.

Fifth Example of Material Data Processing System

Figure 16:
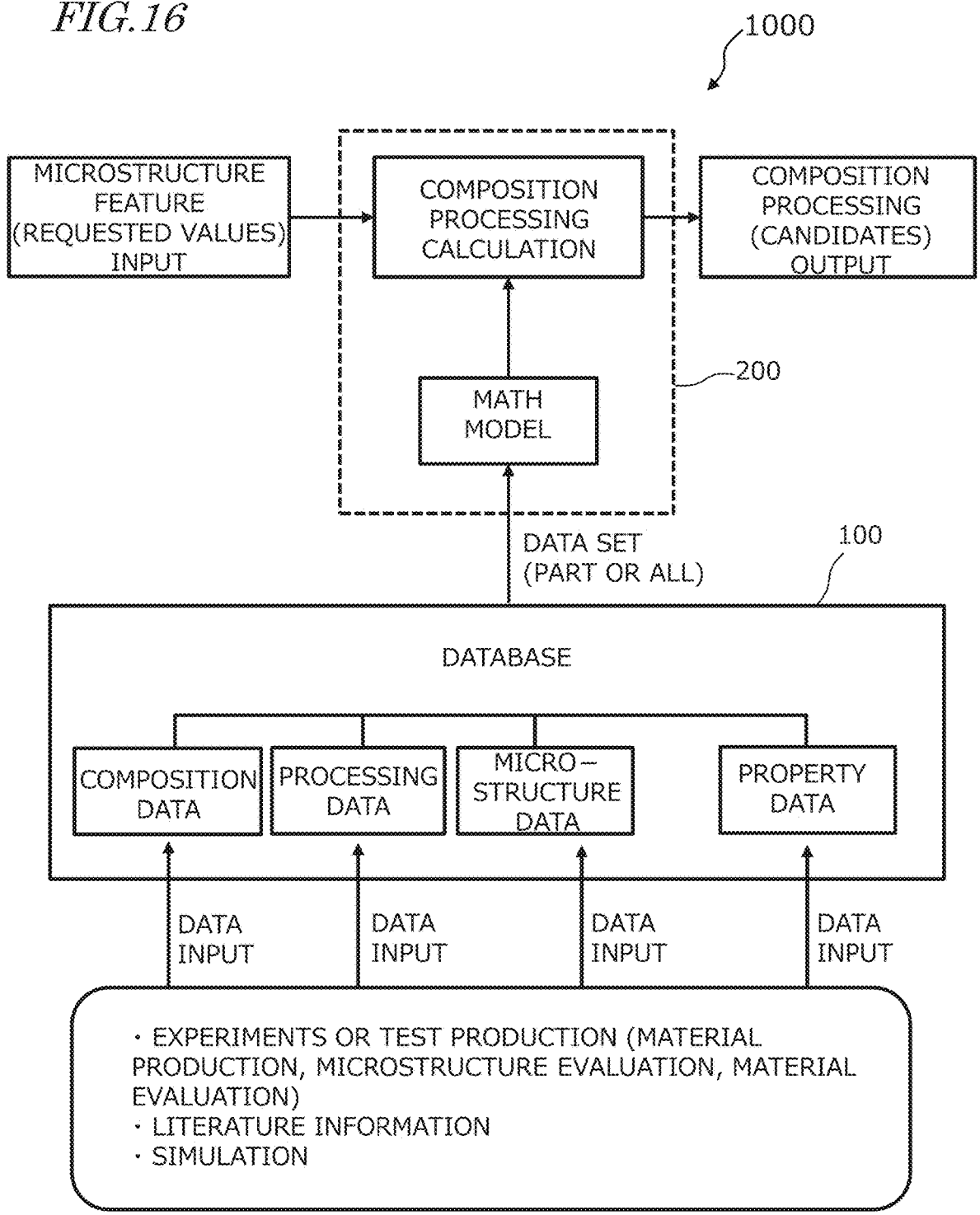
FIG. 16 is a functional block diagram showing an example of data processing in the fifth example of the material data processing system according to an embodiment of the present disclosure.

Next, the fifth example of the material data processing system 1000 is described with reference to FIG. 16. FIG. 16 is a functional block diagram showing an example of data processing in the fifth example. In this example, a mathematical model is derived and configured from a data set that includes a part or all of the data stored in the database 100, where one or a plurality of features registered in the "composition" category and/or the "processing" category are explanatory variables, and one or a plurality of features registered in the "microstructure" category, which include the feature regarding the magnetic phase transition, such as Curie temperature $T_c$, are objective variables.

When values of requested microstructure features (requested values) are input to the data processing device 200, the data processing device 200 solves an inverse problem by a known method using the mathematical model as constructed above and outputs candidates for the "composition" and/or "processing" which can realize the input microstructure features.

In this example, the values of the microstructure features to be achieved may be, for example, derived from the values of the requested material properties by the data processing previously described with reference to FIG. 13 or FIG. 14. When selecting candidates for the "composition" and/or "processing" which are to be output, boundary conditions may be determined beforehand. For example, the range or values of the composition may be fixed.

In this example, the data processing device 200 of FIG. 16 derives a mathematical model using the data of the database 100 and executes composition and processing calculations based on that mathematical model. Alternatively, the data processing device 200 may obtain a mathematical model derived by another data processing device 200 by communication and execute the composition and processing calculations based on that mathematical model.

Sixth Example of Material Data Processing System

Figure 17:
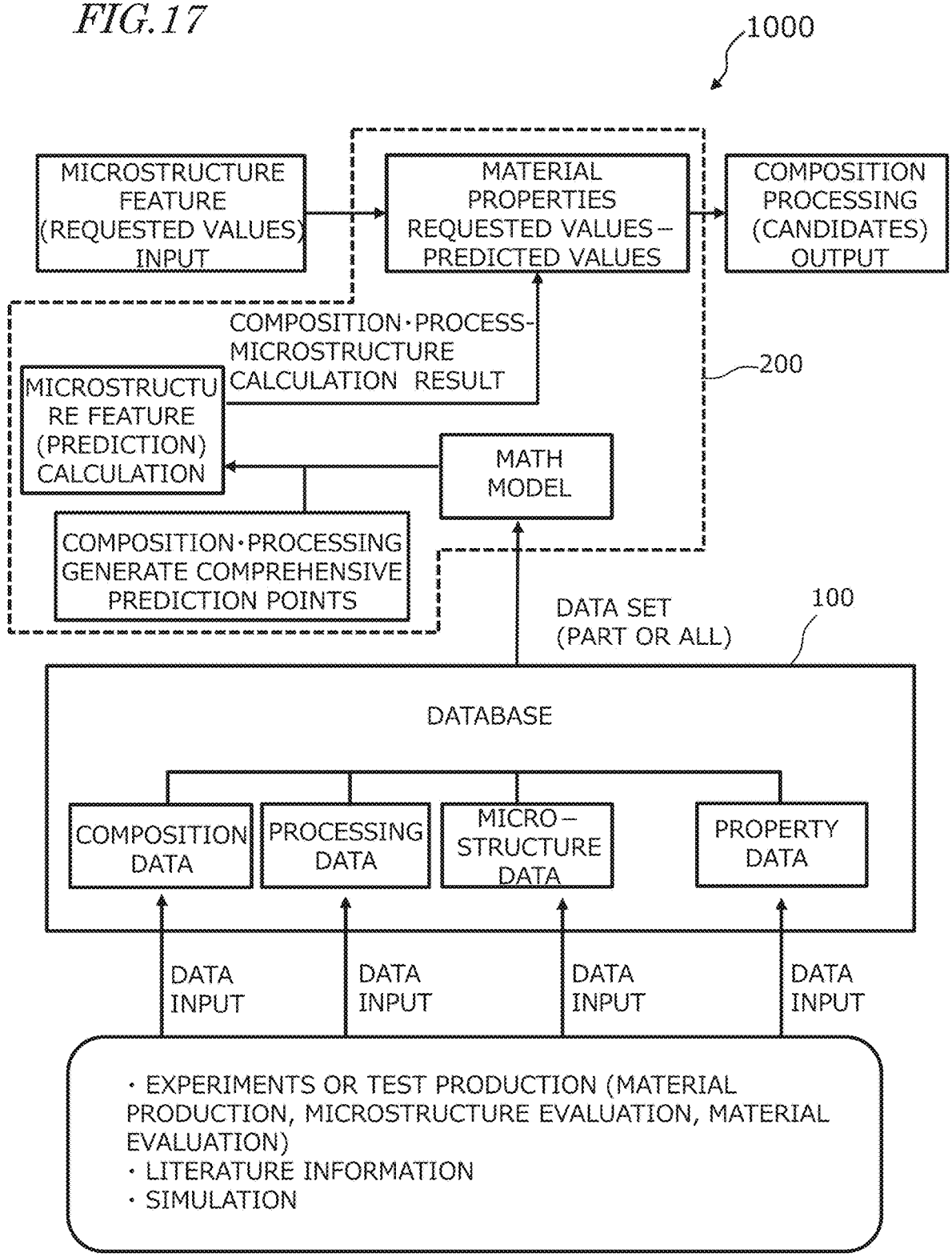
FIG. 17 is a functional block diagram showing an example of data processing in the sixth example of the material data processing system according to an embodiment of the present disclosure.

Next, the sixth example of the material data processing system 1000 is described with reference to FIG. 17. FIG. 17 is a functional block diagram showing an example of data processing in the sixth example. In this example, the data processing device 200 derives and configures a mathematical model from a data set that includes a part or all of the data stored in the database, where one or a plurality of features registered in the "composition" category and/or the "processing" category are explanatory variables, and one or a plurality of features registered in the "microstructure" category, which include the feature regarding the magnetic phase transition, such as Curie temperature $T_c$, are objective variables.

Next, as for one or a plurality of items registered in the "composition" category and/or the "processing" category, comprehensive prediction points are generated, and predictive values of the features are calculated using the previously-described mathematical model for one or more of the items registered in the "microstructure" category corresponding to the generated prediction points. Thereafter, when values of the "microstructure" to be achieved (requested values) are input to the data processing device 200, values closer to the input requested values are extracted from a series of resultant predicted values of one or a plurality of features registered in the "microstructure" category, which include the feature regarding the magnetic phase transition, such as Curie temperature $T_c$, and output as candidates for the "composition" and/or "processing." The difference between the requested values and the predicted values, which is the criterion for judgment about the candidate extraction, is appropriately determined according to its purpose.

In this example, the data processing device 200 of FIG. 17 derives a mathematical model using the data of the database 100 and executes, based on that mathematical model, generation of comprehensive prediction points of the composition and process, (predictive) calculation of the microstructure features, and comparison between the requested values and the predicted values of the material properties. Alternatively, the data processing device 200 may obtain a mathematical model derived by another data processing device 200 by communication and execute, based on that mathematical model, generation of comprehensive prediction points of the composition and process, (predictive) calculation of the microstructure features, and comparison between the requested values and the predicted values of the material properties.

In this example, also, the values of the microstructure features to be achieved may be derived from, for example, the values of the requested material properties by the data processing previously described with reference to FIG. 13 or FIG. 14. For example, when selecting candidates for the "composition" and/or "processing" which are to be output, boundary conditions may be determined beforehand. For example, the range or values of the composition may be fixed.

The predicted values of the "microstructure" calculated using the mathematical model and the comprehensive prediction points of the "composition" and/or "processing" may be compiled into a database beforehand.

The "comprehensive prediction points" previously described with reference to FIG. 14 or FIG. 17 can be obtained by, for example, performing the following. First, for some or all of the items registered in the "microstructure" of FIG. 14 and the "composition and process" of FIG. 17, the extent in which it is estimated to be possible is set. Thereafter, for each of the items, a plurality of numerals are set with random or predetermined intervals. Then, all combinations of the plurality of numerical values for each item are created. In the example of FIG. 14 or FIG. 17, the results of the "material properties" and the "microstructure features" obtained by applying the mathematical model to the set comprehensive prediction points of the "microstructure" or the "composition and process" may be stored in the database that stores the data used for obtaining such "comprehensive prediction points," or may be stored in another database and used when they are necessary.

Further, an analysis may be performed with the "composition," "processing" and/or "material properties" being associated with one another via the data of the "microstructure features." For example, the "microstructure features" may be predicted from the "composition" and the "processing" using the fourth example (FIG. 15), and furthermore, the "material properties" may be predicted from the "microstructure features" predicted in the first example (FIG. 12). Also, candidates for the "microstructure features" may be determined from requested values of the "material properties" by the second example (FIG. 13), and furthermore, candidates for the "composition" or "processing" may be obtained from the determined "microstructure features" by the sixth example (FIG. 17). These are merely some examples of the combinations, and there is no limit on the combinations of the first through fifth examples for associating the "composition" and the "processing" with the "material properties" via the "microstructure features."

A database, a material data processing system, and a method of creating a database according to the present disclosure are suitably applicable to materials informatics, which employs informatics such as data mining to efficiently search for novel or alternative materials, and can be used for development of novel or alternative materials.

What is claimed is:

1. A material data processing system, comprising:
at least one database configured to store data associated with an identifier unique to each sample, the data including: first data representative of at least one of composition data, processing data, and property data for each sample, and second data representative of microstructure data for each sample, and the microstructure data including a feature determined based on a temperature dependence of magnetization for each sample; and
a data processing device capable of accessing the database to retrieve the data therefrom, wherein
the data processing device receives an input of a variable of a microstructure, which includes a feature determined based on a temperature dependence of magnetization of a material, and outputs a variable that defines a property of the material, a variable that defines a composition of the material, and/or a variable that defines processing of the material.

2. The material data processing system of claim 1, wherein
the data processing device calculates an output value of an objective variable from an input value of an explanatory variable based on a mathematical model that is based on the data stored in the database, and
the mathematical model includes the feature determined based on the temperature dependence of magnetization as an explanatory variable that defines the microstructure and includes at least one of the composition, processing, and property as an objective variable.

3. The material data processing system of claim 1, wherein
the data processing device calculates an output value of an explanatory variable from an input value of an objective variable based on a mathematical model that is based on the data stored in the database, and
the mathematical model includes the feature determined based on the temperature dependence of magnetization as an explanatory variable that defines the microstructure and includes at least one of the composition, processing, and property as an objective variable.

4. The material data processing system of claim 1, wherein the feature determined based on the temperature dependence of magnetization is a feature regarding a magnetic phase transition.

5. The material data processing system of claim 4, wherein the feature regarding the magnetic phase transition includes at least one of a Curie temperature and a Neel temperature.

6. The material data processing system of claim 1, wherein
the first data includes, as the composition data, a type of elements contained in each sample and a composition ratio of the elements, and
the first data includes, as the processing data, a parameter that defines a condition of a heat treatment performed in a step of producing each sample.

7. The material data processing system of claim 1, wherein the first data includes, as the property data, at least one of a residual magnetic flux density, coercivity, saturation magnetization, and magnetic permeability of each sample.

8. The material data processing system of claim 1, wherein the second data includes, as the microstructure data, a parameter that defines a crystal structure of a primary phase contained in each sample.

9. A material data processing system for predicting properties, compositions, and/or processes of materials, comprising:
a database configured to store: first data representative of at least one of composition data, processing data, and property data for each sample, and second data representative of microstructure data for each sample, the microstructure data including a feature determined based on a temperature dependence of magnetization for each sample; and
a data processing device configured to receive an input of a variable of a microstructure, which includes a feature determined based on a temperature dependence of magnetization of a material, and to output a variable that defines a property of the material, a variable that defines a composition of the material, and/or a variable that defines processing of the material.

10. A material data processing system, comprising:
at least one database configured to store data associated with an identifier unique to each sample, the data including: first data representative of at least one of composition data, processing data, and property data for each sample, and second data representative of microstructure data for each sample, and the microstructure data including a feature determined based on a temperature dependence of magnetization for each sample; and
a data processing device capable of accessing the database to retrieve the data therefrom, wherein
the data processing device includes:
a processor;
a memory connected with the processor, the memory storing a program that defines an operation of the processor; and
a mathematical model configurator capable of constructing a mathematical model based on a first variable and a second variable,
the first variable being defined by at least one of the composition data, the processing data, and the property data of the first data, which is an objective variable,
the second variable being defined by the microstructure data including a feature determined based on the temperature dependence of magnetization of the second data, which is an explanatory variable, and
the processor executes an arithmetic operation based on the mathematical model according to the program to determine an output value, which is at least one variable that defines a composition, processing, property, and microstructure of the material, from an input value, which is at least one variable that defines the composition, processing, property, and microstructure of the material.

11. A material data processing system for predicting properties, compositions, and/or processes of materials, comprising:

a database configured to store: first data representative of at least one of composition data, processing data, and property data for each sample, and second data representative of microstructure data for each sample, the microstructure data including a feature determined based on a temperature dependence of magnetization for each sample; and a mathematical model configurator capable of constructing a mathematical model based on a first variable and a second variable, the first variable being defined by at least one of the composition data, the processing data, and the property data of the first data, which is an objective variable, and the second variable being defined by the microstructure data including a feature determined based on the temperature dependence of magnetization of the second data, which is an explanatory variable, and a data processing device configured to determine an output value, which is at least one variable that defines a composition, processing, property, and microstructure of the material, from an input value, which is at least one variable that defines the composition, processing, property, and microstructure of the material, in accordance with the mathematical model constructed by the mathematical model configurator.

* * * * *